(12) United States Patent
Ludwig et al.

(10) Patent No.: US 7,702,850 B2
(45) Date of Patent: Apr. 20, 2010

(54) TOPOLOGY INDEPENDENT STORAGE ARRAYS AND METHODS

(76) Inventors: Thomas Earl Ludwig, 4800 Camino Costado, San Clemente, CA (US) 92673; Charles William Frank, 62 Wheeler, Irvine, CA (US) 92620

( * ) Notice: Subject to any disclaimer, the term of this patent is extended or adjusted under 35 U.S.C. 154(b) by 611 days.

(21) Appl. No.: 11/173,765

(22) Filed: Jul. 1, 2005

(65) Prior Publication Data
US 2006/0206662 A1    Sep. 14, 2006

Related U.S. Application Data

(60) Provisional application No. 60/662,069, filed on Mar. 14, 2005.

(51) Int. Cl.
*G06F 12/06*    (2006.01)
(52) U.S. Cl. ............... 711/114; 711/170; 711/E12.006
(58) Field of Classification Search .............. None
See application file for complete search history.

(56) References Cited

U.S. PATENT DOCUMENTS

| | | |
|---|---|---|
| 4,890,227 A | 12/1989 | Watanabe et al. |
| 5,129,088 A | 7/1992 | Auslander et al. |
| 5,193,171 A | 3/1993 | Shinmura et al. |
| 5,506,969 A | 4/1996 | Wall et al. |
| 5,546,541 A | 8/1996 | Drew et al. |
| 5,590,124 A | 12/1996 | Robins |
| 5,590,276 A | 12/1996 | Andrews |
| 5,634,111 A | 5/1997 | Oeda et al. |
| 5,742,604 A | 4/1998 | Edsall et al. |
| 5,758,050 A | 5/1998 | Brady et al. |
| 5,758,188 A | 5/1998 | Appelbaum et al. |
| 5,867,686 A | 2/1999 | Conner et al. |
| 5,884,038 A | 3/1999 | Kapoor |
| 5,889,935 A | 3/1999 | Ofek et al. |
| 5,930,786 A | 7/1999 | Carino, Jr. et al. |

(Continued)

FOREIGN PATENT DOCUMENTS

EP    0485110    5/1992

(Continued)

OTHER PUBLICATIONS

Thomas E. Anderson, Michael D. Dahlin, Jeanna M. Neefe, David A. Patterson, Drew S. Roselli, and Randolph Y. Wang, Serverless network file systems. Dec. 1995. In Proceedings of the 15th Symposium on Operating Systems Principles.

(Continued)

*Primary Examiner*—Reginald G Bragdon
*Assistant Examiner*—Eric Loonan
(74) *Attorney, Agent, or Firm*—Schwabe, Williamson & Wyatt, P.C.

(57) ABSTRACT

A topology independent storage array. In a preferred embodiment the topology of the array is reconfigurable due to information control packets passed among storage nodes comprising the array. The topology of the array, as determine by the relationship between data sets stored within the array's storage nodes and storage maps of the storage node, can be reconfigured without requiring a complete duplication of the entire array. In especially preferred embodiments, the topology of the storage array follows a Z-10 or a Z-110 configuration where storage devices store one or more mirrored parts of a data set per storage device.

29 Claims, 11 Drawing Sheets

U.S. PATENT DOCUMENTS

| | | |
|---|---|---|
| 5,937,169 A | 8/1999 | Connery et al. |
| 5,949,977 A | 9/1999 | Hernandez |
| 5,991,891 A | 11/1999 | Hahn et al. |
| 6,018,779 A | 1/2000 | Blumenau |
| 6,081,879 A | 6/2000 | Arnott |
| 6,101,559 A | 8/2000 | Schultz et al. |
| 6,105,122 A | 8/2000 | Muller et al. |
| 6,128,664 A | 10/2000 | Yanagidate et al. |
| 6,157,935 A | 12/2000 | Tran et al. |
| 6,157,955 A | 12/2000 | Narad et al. |
| 6,202,060 B1 | 3/2001 | Tran |
| 6,246,683 B1 | 6/2001 | Connery et al. |
| 6,253,273 B1 | 6/2001 | Blumenau |
| 6,275,898 B1 | 8/2001 | Dekoning |
| 6,288,716 B1 | 9/2001 | Humpleman et al. |
| 6,295,584 B1 | 9/2001 | DeSota et al. |
| 6,330,236 B1 | 12/2001 | Ofek et al. |
| 6,330,615 B1 | 12/2001 | Gioquindo et al. |
| 6,385,638 B1 | 5/2002 | Baker-Harvey |
| 6,396,480 B1 | 5/2002 | Schindler et al. |
| 6,401,183 B1 | 6/2002 | Rafizadeh |
| 6,434,683 B1 | 8/2002 | West et al. |
| 6,449,607 B1 | 9/2002 | Tomita et al. |
| 6,466,571 B1 | 10/2002 | Dynarski et al. |
| 6,473,774 B1 | 10/2002 | Cellis et al. |
| 6,480,934 B1 | 11/2002 | Hino et al. |
| 6,487,555 B1 | 11/2002 | Bharat et al. |
| 6,549,983 B1 | 4/2003 | Han et al. |
| 6,567,863 B1 | 5/2003 | Lafuite et al. |
| 6,601,101 B1 | 7/2003 | Lee et al. |
| 6,601,135 B1 | 7/2003 | McBrearty et al. |
| 6,618,743 B1 | 9/2003 | Bennett |
| 6,629,264 B1 | 9/2003 | Sicola et al. |
| 6,681,244 B1 | 1/2004 | Cross et al. |
| 6,693,912 B1 | 2/2004 | Wang |
| 6,701,431 B2 | 3/2004 | Subramanian et al. |
| 6,701,432 B1 | 3/2004 | Deng et al. |
| 6,711,164 B1 | 3/2004 | Le et al. |
| 6,732,171 B2 | 5/2004 | Hayden |
| 6,732,230 B1 | 5/2004 | Johnson et al. |
| 6,741,554 B2 | 5/2004 | D'Amico et al. |
| 6,754,662 B1 | 6/2004 | Li |
| 6,757,845 B2 | 6/2004 | Bruce |
| 6,772,161 B2 | 8/2004 | Mahalingam |
| 6,775,672 B2 | 8/2004 | Mahalingam et al. |
| 6,775,673 B2 | 8/2004 | Mahalingam et al. |
| 6,795,534 B2 | 9/2004 | Noguchi |
| 6,799,244 B2 | 9/2004 | Tanaka et al. |
| 6,799,255 B1 | 9/2004 | Blumenau et al. |
| 6,834,326 B1 | 12/2004 | Wang et al. |
| 6,853,382 B1 | 2/2005 | Van Dyke et al. |
| 6,854,021 B1 | 2/2005 | Schmidt et al. |
| 6,862,606 B1 | 3/2005 | Major et al. |
| 6,876,657 B1 | 4/2005 | Brewer et al. |
| 6,886,035 B2 | 4/2005 | Wolff |
| 6,894,976 B1 | 5/2005 | Banga et al. |
| 6,895,461 B1 | 5/2005 | Thompson |
| 6,895,511 B1 | 5/2005 | Borsato et al. |
| 6,901,497 B2 | 5/2005 | Tashiro et al. |
| 6,904,470 B1 | 6/2005 | Ofer et al. |
| 6,907,473 B2 | 6/2005 | Schmidt et al. |
| 6,912,622 B2 | 6/2005 | Miller |
| 6,917,616 B1 | 7/2005 | Normand et al. |
| 6,922,688 B1 | 7/2005 | Frey, Jr. |
| 6,928,473 B1 | 8/2005 | Sundaram et al. |
| 6,941,555 B2 | 9/2005 | Jacobs et al. |
| 6,947,430 B2 | 9/2005 | Bilic et al. |
| 6,985,956 B2 | 1/2006 | Luke et al. |
| 7,039,934 B2 | 5/2006 | Terakado et al. |
| 7,051,087 B1 | 5/2006 | Bahl et al. |
| 7,065,579 B2 | 6/2006 | Traversat et al. |
| 7,069,295 B2 | 6/2006 | Sutherland et al. |
| 7,073,090 B2 | 7/2006 | Yanai et al. |
| 7,111,303 B2 | 9/2006 | Macchiano et al. |
| 7,120,666 B2 | 10/2006 | McCanne et al. |
| 7,145,866 B1 | 12/2006 | Ting et al. |
| 7,149,769 B2 | 12/2006 | Lubbers et al. |
| 7,152,069 B1 | 12/2006 | Santry et al. |
| 7,184,424 B2 | 2/2007 | Frank et al. |
| 7,188,194 B1 | 3/2007 | Kuik et al. |
| 7,203,730 B1 | 4/2007 | Meyer et al. |
| 7,206,805 B1 | 4/2007 | McLaughlin, Jr. |
| 7,237,036 B2 | 6/2007 | Boucher et al. |
| 7,260,638 B2 | 8/2007 | Crosbie |
| 7,263,108 B2 | 8/2007 | Kizhepat |
| 7,278,142 B2 | 10/2007 | Bandhole et al. |
| 7,296,050 B2 | 11/2007 | Vicard |
| 7,353,266 B2 | 4/2008 | Bracewell et al. |
| 7,415,018 B2 | 8/2008 | Jones et al. |
| 7,428,584 B2 | 9/2008 | Yamamoto et al. |
| 7,436,789 B2 | 10/2008 | Caliskan et al. |
| 7,447,209 B2 | 11/2008 | Jeffay et al. |
| 7,463,582 B2 | 12/2008 | Kelly et al. |
| 2001/0020273 A1 | 9/2001 | Murakawa |
| 2001/0026550 A1 | 10/2001 | Kobayashi |
| 2001/0049739 A1 | 12/2001 | Wakayama et al. |
| 2002/0026558 A1* | 2/2002 | Reuter et al. ............ 711/114 |
| 2002/0029286 A1 | 3/2002 | Gioquindo et al. |
| 2002/0039196 A1 | 4/2002 | Chiarabini |
| 2002/0052962 A1 | 5/2002 | Cherkasova et al. |
| 2002/0062387 A1 | 5/2002 | Yatziv |
| 2002/0065875 A1 | 5/2002 | Bracewell et al. |
| 2002/0087811 A1 | 7/2002 | Khare et al. |
| 2002/0091830 A1 | 7/2002 | Muramatsu |
| 2002/0126658 A1 | 9/2002 | Yamashita |
| 2002/0165978 A1 | 11/2002 | Chui |
| 2003/0018784 A1 | 1/2003 | Lette et al. |
| 2003/0023811 A1 | 1/2003 | Kim et al. |
| 2003/0026246 A1 | 2/2003 | Huang et al. |
| 2003/0065733 A1 | 4/2003 | Pecone |
| 2003/0069995 A1 | 4/2003 | Fayette |
| 2003/0081592 A1 | 5/2003 | Krishnarajah et al. |
| 2003/0118053 A1 | 6/2003 | Edsall et al. |
| 2003/0130986 A1 | 7/2003 | Tamer et al. |
| 2003/0161312 A1 | 8/2003 | Brown et al. |
| 2003/0172157 A1 | 9/2003 | Wright et al. |
| 2003/0182349 A1 | 9/2003 | Leong et al. |
| 2003/0202510 A1 | 10/2003 | Witkowski et al. |
| 2003/0204611 A1 | 10/2003 | McCosh et al. |
| 2004/0025477 A1 | 2/2004 | Sichera et al. |
| 2004/0047367 A1 | 3/2004 | Mammen |
| 2004/0078465 A1 | 4/2004 | Coates et al. |
| 2004/0100952 A1 | 5/2004 | Boucher et al. |
| 2004/0181476 A1 | 9/2004 | Smith et al. |
| 2004/0184455 A1 | 9/2004 | Lin |
| 2005/0033740 A1 | 2/2005 | Cao et al. |
| 2005/0102522 A1 | 5/2005 | Kanda |
| 2005/0144199 A2 | 6/2005 | Hayden |
| 2005/0166022 A1 | 7/2005 | Watanabe |
| 2005/0175005 A1 | 8/2005 | Brown |
| 2005/0198371 A1 | 9/2005 | Smith et al. |
| 2005/0246401 A1 | 11/2005 | Edwards et al. |
| 2005/0267929 A1 | 12/2005 | Kitamura |
| 2005/0270856 A1 | 12/2005 | Earhart et al. |
| 2005/0286517 A1 | 12/2005 | Babbar et al. |
| 2006/0036602 A1* | 2/2006 | Unangst et al. ............ 707/9 |
| 2006/0133365 A1 | 6/2006 | Manjunatha et al. |
| 2006/0168345 A1 | 7/2006 | Siles et al. |
| 2006/0176903 A1 | 8/2006 | Coulier |
| 2007/0101023 A1 | 5/2007 | Chhabra et al. |
| 2007/0110047 A1 | 5/2007 | Kim |
| 2008/0181158 A1 | 7/2008 | Bouazizi et al. |

| | | |
|---|---|---|
| 2008/0279106 A1 | 11/2008 | Goodfellow et al. |

FOREIGN PATENT DOCUMENTS

| | | |
|---|---|---|
| EP | 0654736 | 5/1995 |
| EP | 0700231 | 3/1996 |
| EP | 0706113 | 4/1996 |
| JP | 2001094987 | 4/2001 |
| JP | 2001359200 | 12/2001 |
| JP | 2002252880 | 9/2002 |
| JP | 2002318725 | 10/2002 |
| JP | 2005265914 | 9/2005 |
| WO | WO/01/01270 | 4/2001 |
| WO | WO02/15018 | 2/2002 |

OTHER PUBLICATIONS

Lee et al. "A Comparison of Two Distributed Disk Systems" Digital Systems Research Center—Research Report SRC-155, Apr. 30, 1998, XP002368118.

Bruschi and Rosti, "Secure multicast in wireless networks of mobile hosts: protocols and issues", Mobile Networks and Applications, vol. 7, issue 6 (Dec. 2002), pp. 503-511.

Satran et al. "Internet Small Computer Systems Interface (iSCSI)" IETF Standard, Internet Engineering Task Force, IETF, CH, Apr. 2004, XP015009500, ISSN: 000-0003.

Lee et al. "Petal: Distributed Virtual Disks", 7th International Conference on Architectural Support for Programming Languages and Operation Systems. Cambridge, MA., Oct. 1-5, 1996. International Conference on Architectural Support for Programming Languages and Operation Systems (ASPLOS), New, vol. Conf. 7, Oct. 1, 1996, pp. 84-92, XP000681711, ISBN: 0-89791-767-7.

"Limited distributed DASD Checksum, a RAID Hybrid" IBM Technical Disclosure Bulletin, vol. 35, No. 4a, Sep. 1992, pp. 404-405, XP000314813 Armonk, NY, USA.

* cited by examiner

US 7,702,850 B2

TOPOLOGY INDEPENDENT STORAGE ARRAYS AND METHODS

This application claims priority to U.S. provisional application Ser. No. 60/662,069 filed Mar. 14, 2005.

FIELD OF THE INVENTION

The field of invention is storage arrays.

BACKGROUND OF THE INVENTION

Throughout the history of data storage the size of a storage solution has grown. Computers first stored data at the byte level, then at the disk level. The capacity of disks has grown from hundreds of kilobytes to megabytes to gigabytes and will continue grow. As computing environments have grown, so has the environment's demand for yet larger storage solutions. At each stage of growth the atomic unit of the storage solution has also grown from individual disks to multiple disks to complete systems comprising storage farms that include large arrays of numerous disks.

In the world of data storage, RAID stands for "Redundant Array of Inexpensive Disks." Nothing could be further from the truth due the high cost to implement a traditional RAID storage array that meets criteria for a solid solution. Each storage array comprises a set of array parameters that fits the desired criteria where array parameters include metrics based on cost, reliability, performance, capacity, availability, scalability, or other values important to a customer. Typically RAID systems require specialized hardware including SCSI disks, iSCSI equipment, or Fibre Channel switches forcing consumers to pay a large premium to achieve their desired criteria for a solution. High costs place storage array solutions well beyond the reach of consumers and small to medium businesses (SMB). Enterprises, where reliability or performance far out weigh cost, can afford an effective solution.

RAID systems and their associated hardware offer customers a very coarse grained approach to storage solutions. Each RAID level, RAID-0, 1, 0+1, 10, 5, 53, and so on, offers one specific configuration of disks handled by a controller or complex software. Such coarse grained approaches map data to physical locations via a storage map at the disk level or worse yet at the system level. Consequently, these systems have a single fixed topology as defined by their storage maps which govern how data sets contained on the array's disks relate to each other. In addition, each system has a specific set of storage array parameters associated with them. For example, RAID-0 striping offers performance determined by the number of disks in the array but does not offer improved reliability through redundant data. RAID-1 offers reliability through data redundancy on multiple disks but does not offer performance gains. This list continues for each RAID level. Once customers deploy a RAID system, they suffer a great deal of pain migrating to a new system that more closely matches their criteria for a solution. Customers have no easy method of altering an array's parameters to fine tune their solution after the array has been deployed.

Storage systems with a fixed topology, coarse grained storage maps, and specific array parameters force customers to decide a priori exactly what their desired criteria are for a solution. Once the customer determines the criteria for an array's parameters the customer must purchase a storage solution that best matches the criteria, forcing the customer to purchase "up to" the RAID level that best fits the solution criteria and hope that it fits any future needs as well. So, the array cost is high because customers must pursue fixed topology solutions at the system level where controllers govern the system rather than at a fine grained level. If customers had fine grained control over their storage solutions, they would manage their costs more effectively and attain greater coverage of their desired storage solution space.

Clearly, customers need a more malleable storage solution where the customer adjusts the array parameters to more closely fit an application's exact needs as those needs are understood or change. Furthermore, the solution should offer customers the ability to adjust an existing solution without requiring replacement of the system or replicating the entire system. Therefore, an improved storage array should have the following characteristics:

The storage array should be topology independent allowing the array to change over time without concern for changes in the topology
  The storage array should offer adjustable reliability, performance, capacity, cost per unit storage, or availability
  The storage array should scale naturally at or below the disk level, lowering the atomic unit of a storage solution to the smallest identifiable granularity
  The storage array's storage maps should offer fine grained control of data storage at or below the disk level without aggregation of atomic storage units into larger structures
  The physical location of data within the array should be dynamic allowing data to migrate from one physical location to another in a manner transparent to operating systems, file systems, or applications A number of attempts have been made in the past to offer such a solution by combining various RAID levels. Unfortunately, all the attempts have failed to fully provide a cost-effective solution to customers while maintaining reliability, performance, or availability. All existing solutions suffer from scalability issues and have coarse grained storage maps at the system level.

Intel offers a Matrix RAID system where two disks are deployed within a server. The Matrix RAID offers a topology where each disk has one striped partition and one mirrored partition. The mirrored partition on a first disk mirrors the striped partition on a second disk. Through this topology the Matrix RAID system offers double the performance of a single disk system because data stripes across two disks and performs I/O operations in parallel, to within limits of the disk interface. In addition, data is reliable because the data is mirrored providing redundancy should one disk fail. The Matrix RAID is very similar to a RAID-10 system where the capacity of the system is one half of the total disk space; however, data is mirrored advantageously at a partition level rather than a disk level. Although the Matrix RAID system has a number of benefits from a reliability and performance perspective, it suffers from other limitations. The topology is fixed which means a customer cannot alter the array configuration once the customer deploys the system. The system does not scale because the Matrix RAID requires specific BIOS hardware and chipsets to realize the system and is further limited to two disks. Customers of the Matrix RAID are not able to fine tune the system to fit their exact needs after the system is deployed without great effort or cost.

InoStor Corporation's RAIDn system as outlined in a U.S. Pat. No. 6,557,123 follows a more traditional RAID route. Disks are combined together to create a storage array and the customer selects a desired reliability as defined by a number of disks in the array that can fail without the array suffering data loss. Data stripes across the disks in the array similar to a RAID-5 system along with multiple parity stripes. The number of parity stripes and their arrangement in the array is determined mathematically once the customer selects a desired reliability. InoStor's solution provides a blend of reliability and performance; however, the system suffers from scalability issues because specialized hardware is required to manage and calculate a complex parity. If a customer wishes to increase the capacity of the system, the customer must purchase an additional array. Consequently, InoStor's solution also suffers from the same limitations of a fixed topology as other RAID systems, namely the array cannot adjust easily once deployed.

Unisys Corporation's U.S. Pat. No. 6,785,788 outlines another attempt at offering a flexible storage array. Unisys forgoes parity in favor of mirroring just as the Intel Matrix RAID with the exception data stripes across disks of first capacity then the data mirrors across disks of a second capacity. This topology, also fixed, offers the advantages of performance and further offers customers the ability to purchase disks of disparate sizes thereby offering a more economical solution. However, because the data is still bound to complete disks, the system does not upgrade easily. In addition, the system does not scale naturally at the disk level.

Earlier prior art solutions fall short of offering a truly advantageous solution because they are bound to fixed topologies governed by expensive centralized hardware or complex software with coarse grain storage maps. A virtualized approach where data decouples from physical locations allows for the creation of arrays with flexible topologies governed by reconfigurable policies. Topologies based on nodes that map to logical partitions at or below the disk level rather than nodes that map to disks have the greatest flexibility. If data is decoupled from physical location, then data can move from one physical location to another transparently from the view of clients using the array. Furthermore, each client stores a different storage map thereby "seeing" a different array even though the physical storage system is shared among a number of clients. Topology independent arrays have reduced costs because each element in the system behaves independently eliminating the need for complex centralized governing systems and allows for expansion at the single disk level. Through an appropriate choice of a topological configuration, reliability of a storage array exceeds RAID-10, RAID-5, and even RAID-6 systems. Even though a topology independent array can employ RAID concepts including parity, employing redundancy for reliability offers greater performance at reduced cost because parity does not need to be maintained with specialized hardware. High performance is a natural result of a desired policy that incorporates data striping and scales as desired even after deployment by adding disks. Capacity also scales naturally at the disk level by adding disks to the array. Customers are always able to purchase disks that have the highest capacity-price (or performance-price) ratio. Data availability remains high because data can be mirrored for redundancy or data can move from an un-reliable location to a more reliable location in a manner that is transparent to applications. Customers also have the ability to trade one array parameter for another. For example, when establishing the policy for a topology independent storage array, by increase the reliability of an array via adding additional mirroring the available capacity of the array is reduced in response to the change assuming a fixed number of disks in the array.

Thus, there remains a considerable need for methods and apparatus that allow fine grained control of a storage array without requiring customers to spend a great deal of money to achieve their desired reliability, performance, capacity, scalability, or availability criteria.

SUMMARY OF THE INVENTION

The present invention is directed toward storage arrays whose topology is configured as desired in response to packets comprising control information. Topology independent storage arrays comprise at least two storage nodes that store data within storage devices based on a storage map and whose topology can change based on control information exchanged with the array. The storage map, which can split among array elements or other devices, indicates where data resides on a storage medium within the storage devices. Furthermore, a storage array is virtualized as a plurality of storage nodes whose given topology based on a storage map with granularity below the storage device level. Configuration of a topology independent storage array comprises assigning storage maps to the storage nodes, instructing at least one of the storage nodes to be receptive to packets external to the array, and allowing an array parameter, including reliability or performance, to change in response to changes in another array parameter.

The following sections describe the terms used within this document.

Data Blocks

A "data block" means one unit of data stored or retrieved from a storage array. A data block is referenced through an ID. As clients interact with the storage array, the client sends data packets comprising a data block ID to the storage array which determines the disposition of the data block by the data block's ID and a storage map. Contemplated data blocks comprise various sizes from the bit-level up to many kilobytes, or beyond. In addition contemplated data blocks allow for fixed block sizes or variable data block sizes. Preferred data blocks are 512 bytes in length. Contemplated data block IDs include logical block addresses of arbitrary length. Specifically contemplated address lengths include 48 bit, 64 bit, or 128 bit address.

Storage Medium

"Storage medium" means the physical place where data is stored. Store media comes in many forms, both magnetic and non-magnetic media. Examples of magnetic media include disks or tapes. Examples of non-magnetic media include RAM, flash, optical storage, physical structures, or other mechanisms for storing data. Storage media resides on a storage device. For example, a magnetic disk resides on a hard disk drive, or flash resides on a media card or on a memory chip. Contemplated media also include those yet to be invented, discovered, or exploited.

Storage Device

"Storage device" means a device comprising a storage medium and providing an interface for storing data on the storage device's storage medium. Examples of storage devices include rotating or non-rotating devices. Rotating devices include hard disk drives, or optical drives. Non-rotating devices include RAM or flash chips, USB dongles, mechanical devices based on rectilinear motion, or other relative motion to scan a surface or volume forming a storage medium. Contemplated storage devices include storage devices that store data at the block level.

Storage Map

"Storage map" means a logical construct stored in a memory that comprises information to translate a data block ID into a physical location on a storage medium within a storage device. A storage map comprises arbitrary complexity allowing for at least a one-to-one mapping of a data block ID to a physical location. Additionally, storage maps allow for a one to many mapping where a single data block ID maps to more than one physical location. Storage maps also include maps split into sub-maps. As an example, a first array element knows how to map data block IDs to a second array element based on a first sub-map. The second element knows how to map data block IDs further to a storage medium on a storage device based on a second sub-map. Therefore, "sub-map" means a storage map that is a portion of a complete storage map comprising partial mapping information on how to map data block ID's to a physical location. It is contemplated a storage map's sub-maps distribute among any number elements within a storage array or devices using the array. It is further contemplated that sub-maps of a storage map reside on client systems that use the array. Storage maps comprise an arbitrary granularity of storing data from the system level, to the storage device level, to a partition level on the storage device, to data block level within a partition, or to the byte level within a block. Preferred storage maps have a granularity below the disk level.

Storage Area

"Storage area" means a logical construct having an address allowing systems external or internal to the array to address a storage medium. The storage area combines with a storage map to provide a single logical representation of the storage available on the storage medium. Storage areas use storage maps to map out storage media across one or more storage devices; thereby, allowing placement of data blocks on one or more storage devices. Contemplated addresses include names, tags, IP addresses, or other schemes that provide a mechanism to allow systems to reference or address the storage area. Examples of storage areas include a logical partition on a disk drive that has an IP address, or a section of memory located on a flash memory device assigned a drive letter. An example of a logical partition comprises an IP addressable storage partitions as described in Zetera U.S. patent application Ser. No. 10/473509.

Storage Node

"Storage node" means a virtual construct executing on a processing unit that has access to a storage medium through a storage area. A storage node includes a processing unit and sufficient software or firmware to process packets from external to a storage array or from other storage nodes within the storage array in order to manipulate data stored on the storage medium. Storage nodes represent themselves via an address or name associated with a storage area. An example of a storage node includes a virtual device associated with a network enabled disk drive that presents itself as a local, raw disk drive to a client computer. For example, disk drives adapted via Zetera™ technology have multiple storage nodes because Zetera™ technology assigns names or IP addresses to disk drives and to partitions located on the disk drives.

Storage nodes function independently of each other where one storage node does not have to be aware of another storage node. Each storage node understands which data blocks for which it is responsible based on the storage maps associated with the storage node's storage area. Therefore, a storage node need only respond to data packets containing data block IDs that fall within its storage area. Storage nodes combine together to form a complete storage array. Storage nodes also interact with each other if instructed to do so to allow for operations including copying data from one physical location to another.

The preceding terms are used within this document to facilitate the description of the inventive subject matter and should be interpreted in their broadest sense. Although the terms represent distinct functionality, the concepts represented can combine in any manner to realize an embodiment. For example, the concept of a storage area and a storage node can combine into a single storage node concept that effectively encompasses both functional concepts where a storage node has an address or name. Given this example, the storage node address is equivalent to a storage area address.

Array Policy

"Array policy," or "policy," means a combination of data, software, or firmware stored in a memory that defines a storage array. A policy comprises an array configuration based on array parameters resulting in a topology based on the storage maps of the storage array. Storage arrays configure or reconfigure policies based on control packets containing control information exchanged with an array. Furthermore, a policy allows a client-centric view of an array resulting in multiple clients, each with a custom view, to share the same physical infrastructure but perceiving a different array; or alternatively, resulting in multiple clients sharing the same view of the same array.

Array Parameters

Each storage array has a set of "array parameters" associated with the array policy that determine the overall characteristics of the system as determined by an array's topology. Examples of array parameters include metrics associated with reliability, performance, availability, latency, or other values associated with number of mirrors, scalability, capacity, or cost. One array parameter adjusts in response to changes of another array parameter. Specifically contemplated modifications include decreasing available storage capacity in response to increasing an array's reliability.

Topology

Within this document "topology" refers the logical association between storage nodes with respect to the data stored on the nodes. For example, consider a storage array with three storage nodes A, B, and C where all three nodes are distinguishable by other parameters including physical location, identifier, or name. Assume a first topology defined by node A containing data that is identical to B, but different than C. Also assume a second topology defined by node A, B and C all three containing different data. The first topology is different than the second topology no matter how the nodes are communicatively coupled. Now suppose nodes A, B, and C of the first topology have their differentiating parameters altered such that each node has a new physical location, new identifier, or new name forming a third topology while keeping the same relationship between the data stored on the nodes. The first topology and the third topology have the same topology same because the relationship between the data sets has not changed even though the connections between the nodes could have changed. Therefore, the topology of an array is invariant with respect to the communication interfaces of the storage nodes. The topology is implemented according to an array policy stored in a memory. As a customer modifies the policy of the array, if necessary, the topology changes.

A "topology independent" storage array means the topology of the array can change according to changes in the array policy. Therefore, a topology changes when the array policy is initially configured or reconfigured based on control information. For example, a topology "changes" when storage nodes within the storage array change number, or when storage nodes change the contents of their data sets relative to other node. Traditional arrays based on RAID systems including RAID-0, 1, 10, 5, and so on have fixed topologies because the RAID systems have a known preset structure and the structure cannot change once deployed. This implies a traditional RAID array cannot have its topology altered without changing the physical arrangement of the entire system in order to provide a solution that better fits an applications needs. A RAID-10 cannot change to a RAID-5 without rebuilding a new array or without migrating an entire data set, either physically or logically from one fixed topology to the other.

The teachings herein may be advantageously employed by developers to create dynamic storage arrays that change and evolve to fit a customer's needs even after the storage array is configured. Because the storage arrays have a configurable topology, the storage array configures to meet the reliability, performance, capacity, availability, or scalability requirements of a customer while reducing the over cost of the system relative to traditional storage arrays. In addition, a topology independent array offers many advantages relative to known RAID systems.

Various objects, features, aspects, and advantages of the present invention will become more apparent from the following detailed description of the preferred embodiments of the invention, along with the accompanying drawings in which like numerals represent like components.

DETAILED DESCRIPTION

Many of the concepts within this document are virtual constructs stored in a memory and execute on a processing unit. Therefore, individual elements can reside on any capable system having a processing unit and sufficient software or firmware to govern the elements.

Storage Arrays

Figure 1:
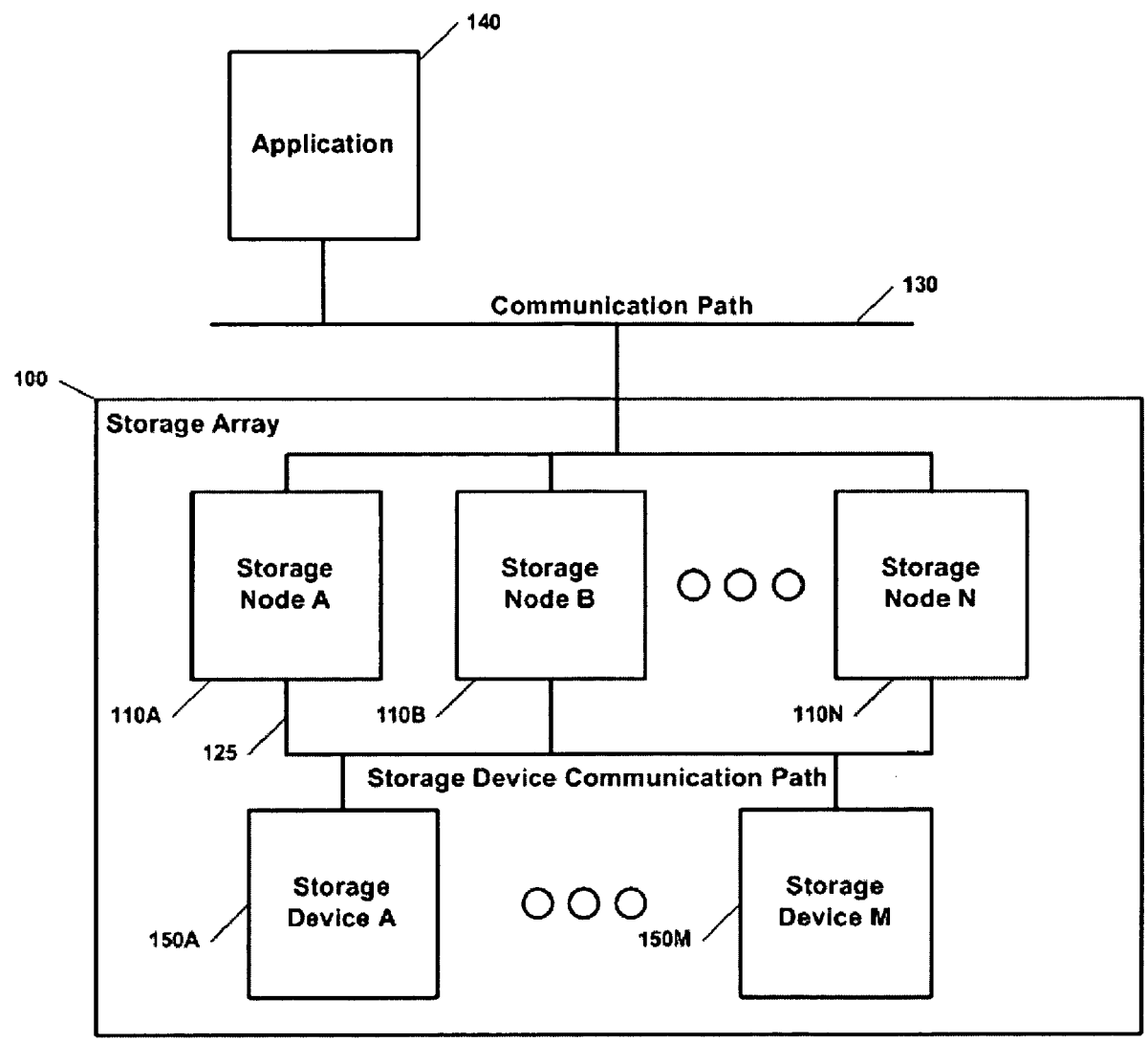
FIG. 1 is a schematic of a storage array from a logical perspective in which the storage array comprises a plurality of storage nodes.

FIG. 1 presents a logical view of contemplated storage array 100 comprising a plurality of storage nodes 110A through 110N. Application 140 accesses storage array 100 through communication path 130 by exchanging packets with array 100 and storage nodes 110A through 110N. The packets are directed toward at least one of storage nodes 110A through 110N or directed to a set of nodes collectively. Therefore, communication path 130 provides an interface to storage array 100. When a storage node receives a control packet or a data packet, it determines how handle the packet appropriately based on information contained within the packet. A control packet, a packet that contains storage array or storage node control information, alters configuration of storage array 100's topology. A data packet, a packet that contains a data block ID, passes to at least one of storage nodes 110A though 110N. Storage nodes 110A through 110N then determine how to interact with storage devices 150A through 150M via storage device communication path 125. Contemplated storage device communication paths include IP network, a PCI bus, SCSI bus, Fibre Channel, or communication busses providing access to storage devices. As shown in FIG. 1, the number of storage nodes does not necessarily have to correspond to the number of storage devices because the storage nodes are virtual constructs that map to the data space contained within the storage devices. Therefore, storage array 100 is virtualized as storage nodes 110A through 110N. It is contemplated that a single storage node spans more than one storage device.

Storage array 100 has many possible embodiments. A preferred embodiment of storage array 100 utilizes communication path 130 as an interface to an IP network where each node exists individually on the network with an IP address or a name that resolves to an IP address that is associated with the node's storage area. Consequently, storage array 100 comprises a distributed set of nodes that can be physically separated from each other where each node has access to a storage device. Yet another contemplated embodiment of storage array 100 uses communication path 130 as an application program interface (API) to application 140. For example, a file system could represent application 140 and use an API to access storage array 100. The file system then perceives storage array 100 as a local, physical device when in fact it is a collection of virtual devices that are distributed physically.

Figure 2:
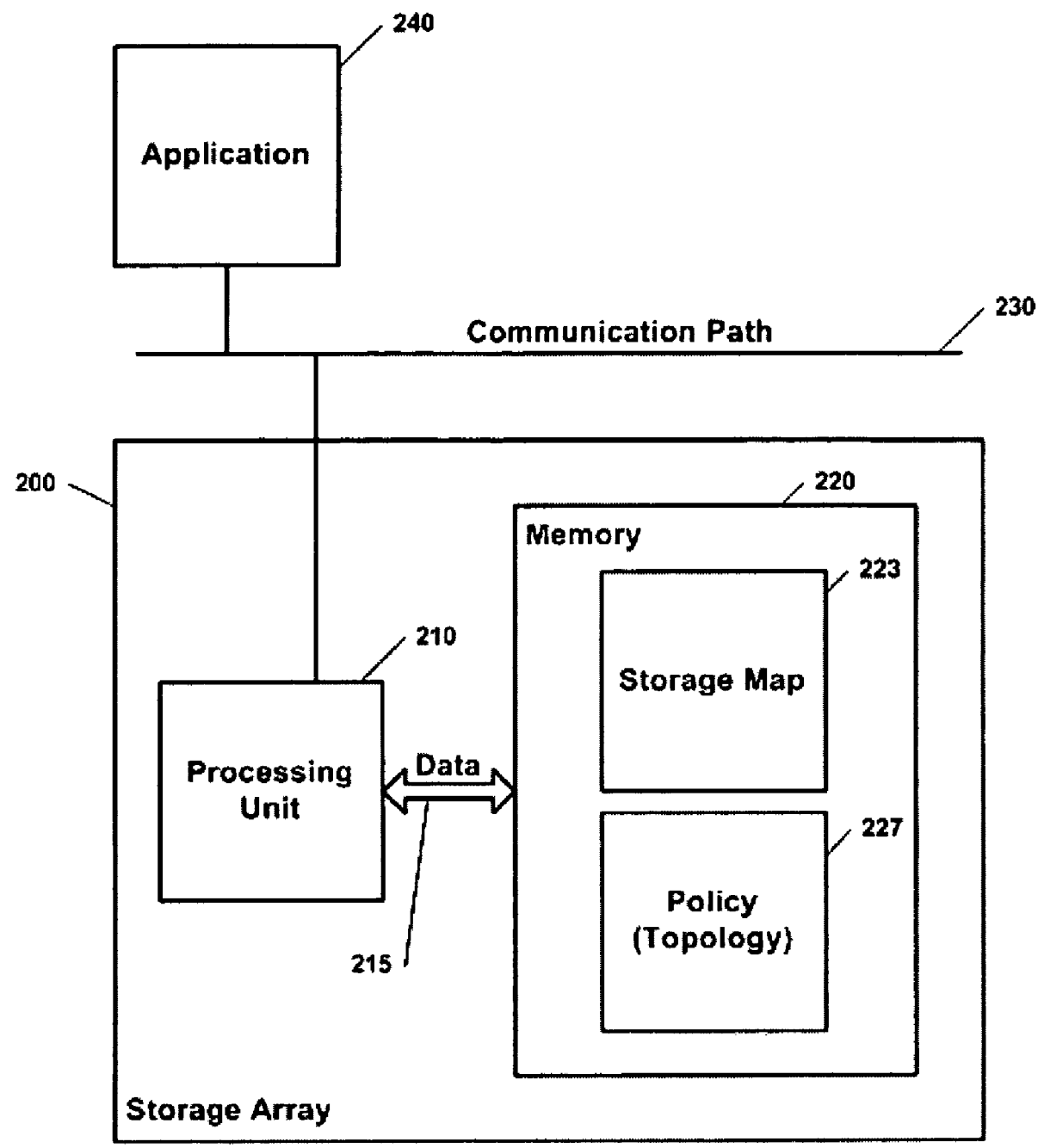
FIG. 2 is a schematic of a storage array from a physical perspective.

FIG. 2 depicts a possible physical embodiment of a topology independent storage array. Storage array 200 comprises a processing unit 210 and memory 220. Application 240 interacts with storage array 200 via an interface provided by communication path 230. Processor unit 210 receives packets from application 240 and determines the disposition of data or control information contained in the packet based on storage map 223 and policy 227 within memory 220. Processing unit 210 accesses memory 220 via data path 215. Due to the virtual nature of storage array 200, the physical location of processing unit 210 and memory 229 can be separated from the storage nodes that are part of storage array 200. As an example, in a preferred embodiment consider, without implied limitation, a computer workstation that interacts with storage array 200. The workstation's CPU functions as processing unit 210 and the workstation's memory functions as memory 220 even though the storage nodes and their associated storage devices composing storage array 200 reside physically far from the workstation. The storage nodes couple to the workstation via a network. As the workstation interacts with the nodes, it accesses the data storage based on storage map 223 in memory 220 and based on policy 227. An alternative preferred embodiment includes a rack-mount enclosure with its own CPU and memory supporting a number of storage devices. Under these circumstances the enclosure's CPU and memory represent processing unit 210 and memory 220, respectively, and are physically separated from where application 240 resides on its workstation. In all cases storage array 200 comprises sufficient software and firmware for allowing application 240 to access data from the array.

Policy 227 comprises data, software, or firmware that determines the topology and characteristics of storage array 200. Policy 227 is initially configured when storage array 200 is designed or built. During initial configuration an administrator adjusts array parameters to fit their storage solutions criteria. Policy 227 results from the configuration and comprises information regarding storage nodes composing the array, a storage map used to map data blocks to physical locations, or other necessary information to allow application 240 or other systems to access the array. In a preferred embodiment, a client's memory will house policy 227. In a more preferred embodiment, policy 227 resides in a separate memory outside the client. However, the client receives sufficient data, software, or firmware representing a storage map that allows the client to properly interact with array 200. Therefore, policy 227 governs storage array 200 and also provides clients with their specific view of the array. This allows multiple clients to either share the same view of an array or to have separate views of the array. An example of a shared view includes multiple clients mounting a shared logical volume that appears as a single drive that all clients see. An example of a separate view includes each individual client mounting a separate un-shared logical volume that only one client sees. In both cases, the policy allows all clients to share the same physical infrastructure by appropriately defining the storage nodes composing array 200 and giving each client an appropriate storage map 223.

Once configured, policy 227 reconfigures based on control information passed to array 200. Reconfiguration of policy 227 allows the topology of array 200 to change to better fit the criteria for a storage solution as determined by changes in array parameters of array 200. For example, if additional storage devices are added to array 200, policy 227 updates to reflect added storage nodes, if required, resulting in a change in topology. Storage map 223 also updates appropriately. Contemplated changes in the policy occur through automated software, by hand, or through management software. Contemplated forms for policy 227 include a device driver under a file system comprising topology information and storage map 223, a data structure, a database, or code embedded in an ASIC. One ordinarily skilled in the art of storage arrays is able to recognize the relationship between configuration storage array parameters, developing an array policy, and establishing a storage map.

Storage Nodes

Figure 3:
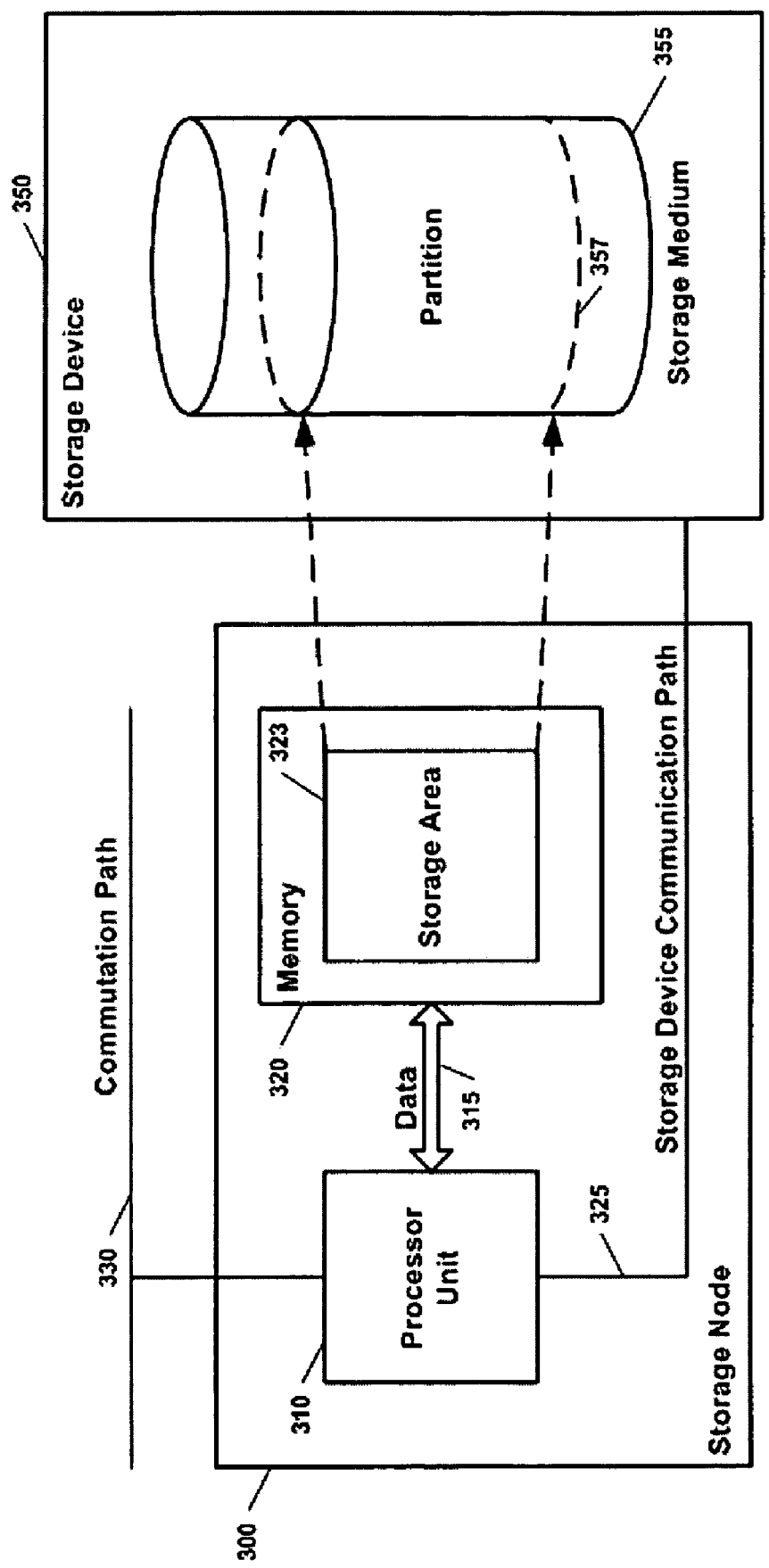
FIG. 3 is a schematic of storage node from a physical perspective depicting the relationship between a storage node, a storage area, and a storage device.

FIG. 3 illustrates a storage node in more detail from a physical perspective. Storage node 300 comprises a virtual construct based on software or firmware running on processing unit 310. Storage node 300 communicates with other storage array elements or remote hosts through the interface provided by communication path 330. As processing unit 310 operates its storage node responsibilities, it references storage area 323 stored in memory 320 through data path 315. Storage area 323 comprises sufficient software or data to instruct processing unit 310 how to access storage device 350 based on data block IDs contained within data packets. In addition, storage area 323 comprises an address or a name that storage node 300 uses to interact with other storage array elements or remote hosts. In a preferred embodiment, communication 300 provides an interface to a packet switched network. Still more preferred embodiments include an interface to IP networks where a name bound to storage area 323 resolves to an IP address. The use of names allows access to storage nodes when storage nodes change address. If DHCP or Auto-IP is used to assign storage nodes addresses, a storage node could obtain a different address on each power-up where as a name can resolves to an address no matter how an address changes. Storage node 300 accesses storage device 350 via storage device communication path 325. Storage area 323 comprises at least part of a storage map that defines where data is written to or read from on storage medium 355. Furthermore, storage area 323 maps to partition 357 which is a portion of larger storage medium 355. Although partition 357 is referenced as a "partition," the term should be interpreted as a sub-set of a larger storage medium rather than a disk partition. Therefore, memory, tape, RAM, flash, or other data storage media can have a partition.

Preferred embodiments allow multiple storage nodes to utilize the same processing unit or the same memory. Additionally, multiple storage nodes can share the same storage devices or share the same storage medium.

Storage node 300 comprises sufficient software to handle control packets or data packets, to access storage devices based on storage area information, or to interact with other storage nodes or clients. Storage node 300 interprets control information from control packets as instructions for the node. Instructions for the node include changing the node's state, changing the state of an attached storage device, removing the node from an array, duplicating the node else where, or other node operations. Storage node 300 interprets data block IDs within data packets in order to determine the final disposition of the packet. Storage nodes have responsibility for a set of data blocks as defined by the storage area 323. Contemplated embodiments of storage node 300 include monolithic code representing multiple nodes, FPGAs, tasks or threads acting as storage nodes, or other coding mechanism that provide similar functionality. A preferred embodiment includes using a single code structure that handles multiple nodes simultaneously. Under such an embodiment, the code structure references storage node information from a data structure. The storage node data structures are easily transported to other processing units and memories when the storage nodes are duplicated.

Storage Maps

Figure 4A:
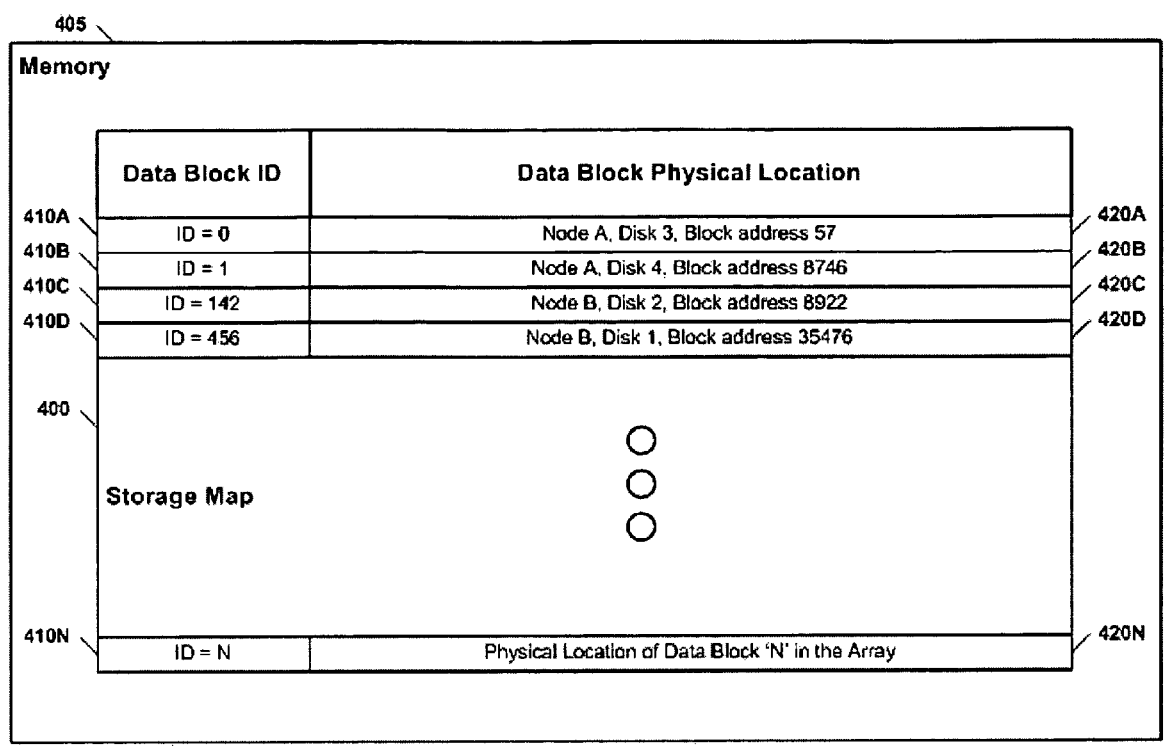
FIG. 4A is a schematic of storage map depicting the relationship between a data block ID and a physical location on a storage medium.

FIG. 4A illustrates a possible storage map. Storage map 400 is stored in memory 405 and comprises software or data. In the example shown, storage map 400 comprises a data table with at least two fields. One field represents data block IDs 410A through 410N. As shown, multiple data block IDs are listed indicating there are an arbitrary number of entries. Another field represents physical locations where data blocks are stored. Physical locations 420A through 420N correspond to data block IDs 410A through 410N respectively. Physical locations 420A through 420N instruct a storage node where to write data or where to read data from a storage medium on a storage device. Storage map 400 can also have more than one physical location for each data block ID.

Although FIG. 4A shows a table contained in memory 405, storage map 400 comprises alternative forms. For example, a preferred storage map 400 comprises software that executes a function to determine the storage location of data based on the data block's ID. An example function includes employing modulo arithmetic to determine if a data block is stored or is not by a storage node. Through the use of a modulo arithmetic function a number of storage nodes combine to form a RAID-0 volume, a striped volume, structure where each storage node in the striped volume is responsible for a different set of data block IDs as determined by the remainder of the modulo arithmetic function. Alternatively, another preferred storage map 400 comprises a software function that includes a minimum block ID and a maximum block ID with a possible offset. If a data block ID falls within the range of ID's as specified by the software function within storage map 400, then the storage node will handle the data block.

By decoupling data block ID 410A through 410N from physical data locations 420A through 420N through storage map 400, the nature of a storage array is further virtualized as storage nodes. Because storage map 400 can be represented as data or as a function, storage map 400 is able to change physical locations 420A through 420N without applications being aware of the change. In addition, multiple storage maps located within multiple storage nodes can be responsible for the same sets of data block IDs, but reference different physical locations. Through this approach, storage nodes combine to form RAID-1 volumes, or mirrored volumes. In addition, if a first storage map on a first storage node is responsible for a list of sequential data block IDs (0 to some large value X, for example) and a second storage map on a second storage node is responsible of a continuation of the sequential list (X+1 to Y, where Y>X, for example), then the first and second storage nodes combine to form a spanned volume.

Figure 4B:
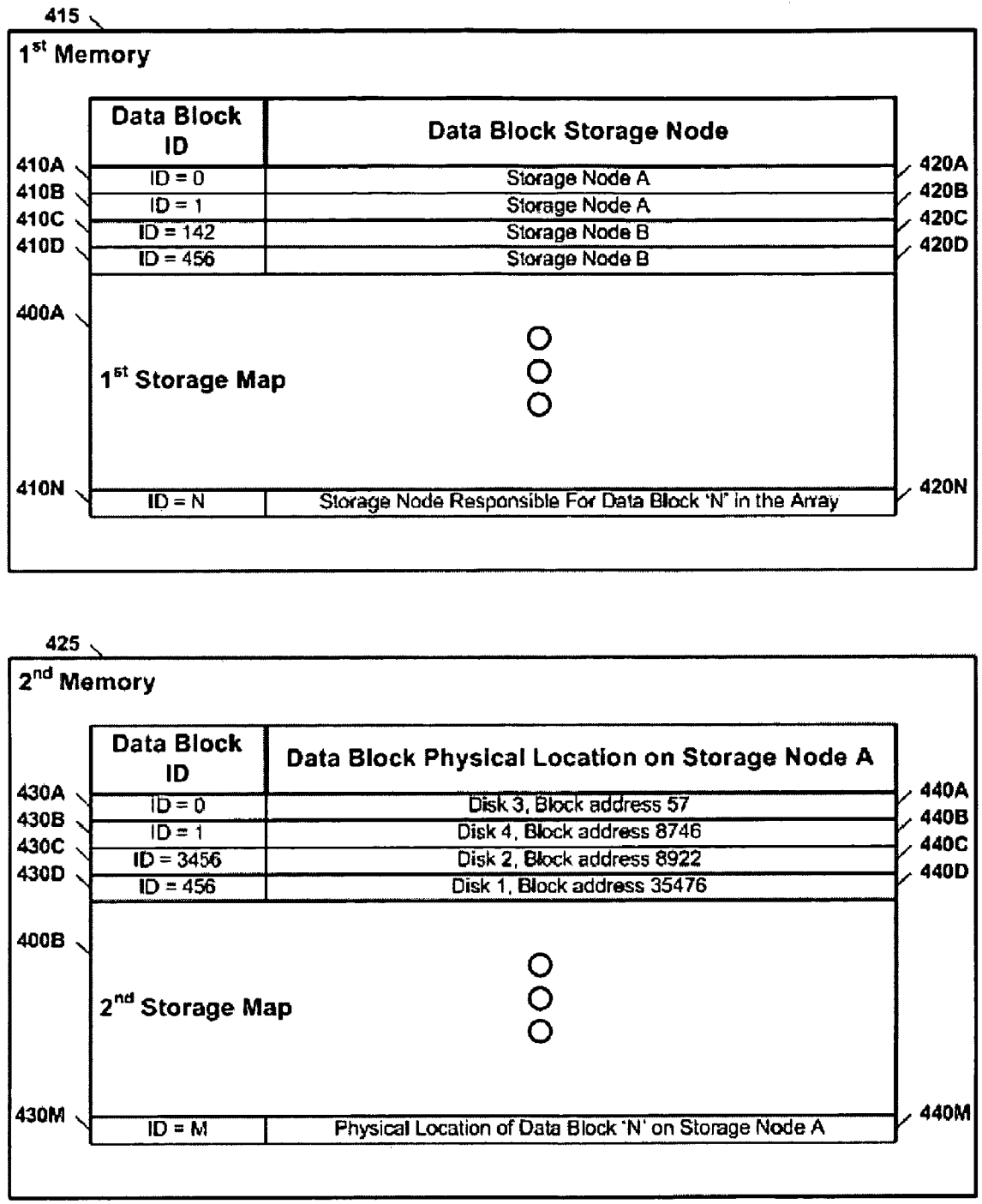
FIG. 4B is a schematic of a split storage map depicting a first sub-map of a storage map in a first memory and a second sub-map of a storage map in a second memory.

FIG. 4B illustrates a split storage map where a first sub-map of a storage map resides in a first memory and a second sub-map of the storage map resides in a second memory. Storage map 400 comprises first storage sub-map 400A and second storage sub-map 400B. First storage sub-map 400A resides in first memory 415 and second storage sub-map 400B resides in memory 425. In the example depicted, first storage sub-map 400A resolves data block IDs 410A through 410N to storage node 420A through 420N. Again, the number of entries in the storage sub-maps is arbitrary. Second storage sub-map 400B further resolves data block IDs 430A through 430M to actual physical locations 440A through 440M. Second storage sub-map 400B is represented as being specific to a storage node and, therefore, has a different number of entries than first storage sub-map 400A. By splitting storage map 400 into sub-maps and placing a sub-map of a storage map into a client memory, clients are able to directly interact with nodes of interest rather than all storage nodes in an array. In a preferred embodiment, a storage array client uses a sub-map of a storage map to resolve which nodes are responsible for a data block. The client sends a data packet with the data block ID to all nodes that are responsible for the data block. The storage nodes further resolve the data block ID to a physical location on one or more storage devices. By splitting storage map 400 multiple clients are able to perceive an array differently from each other. As used herein "split storage map" means a storage map split into sub-maps, each sub-map stored in a different memory. FIG. 4A and FIG. 4B represent storage map 400 as a data table; however, preferred storage maps and preferred sub-maps make efficient use of memory 415 and memory 425 and include modulo functions. It is specifically contemplated that storage map 400 or storage sub-maps 400A and 400B map data at below the storage device level. In a preferred embodiment, storage maps or storage sub-maps provide mapping at a partition granularity or below.

The combination of storage maps and storage nodes give rise to topology independence because they form a virtual storage array. Storage nodes provide access to the storage media and storage maps define the relationships among the data sets stored by the storage nodes. Consequently, an array's topology changes by changing storage nodes within the array. Storage nodes can be added or removed from an array changing the array's topology, or a storage node's storage map can change changing the topology. In addition, storage nodes can migrate from one set of hardware to another by replicating the storage map within the storage area including its address or name, optionally updating the storage maps physical location if required, and optionally copying any data from the previous location to the new location, and finally optionally removing the old node from the system if required. Movement of a storage node requires control over the storage nodes state or possibly the state of a storage device with which the storage node is working.

Two Disk Topology Independent Storage Array

Figure 5A:
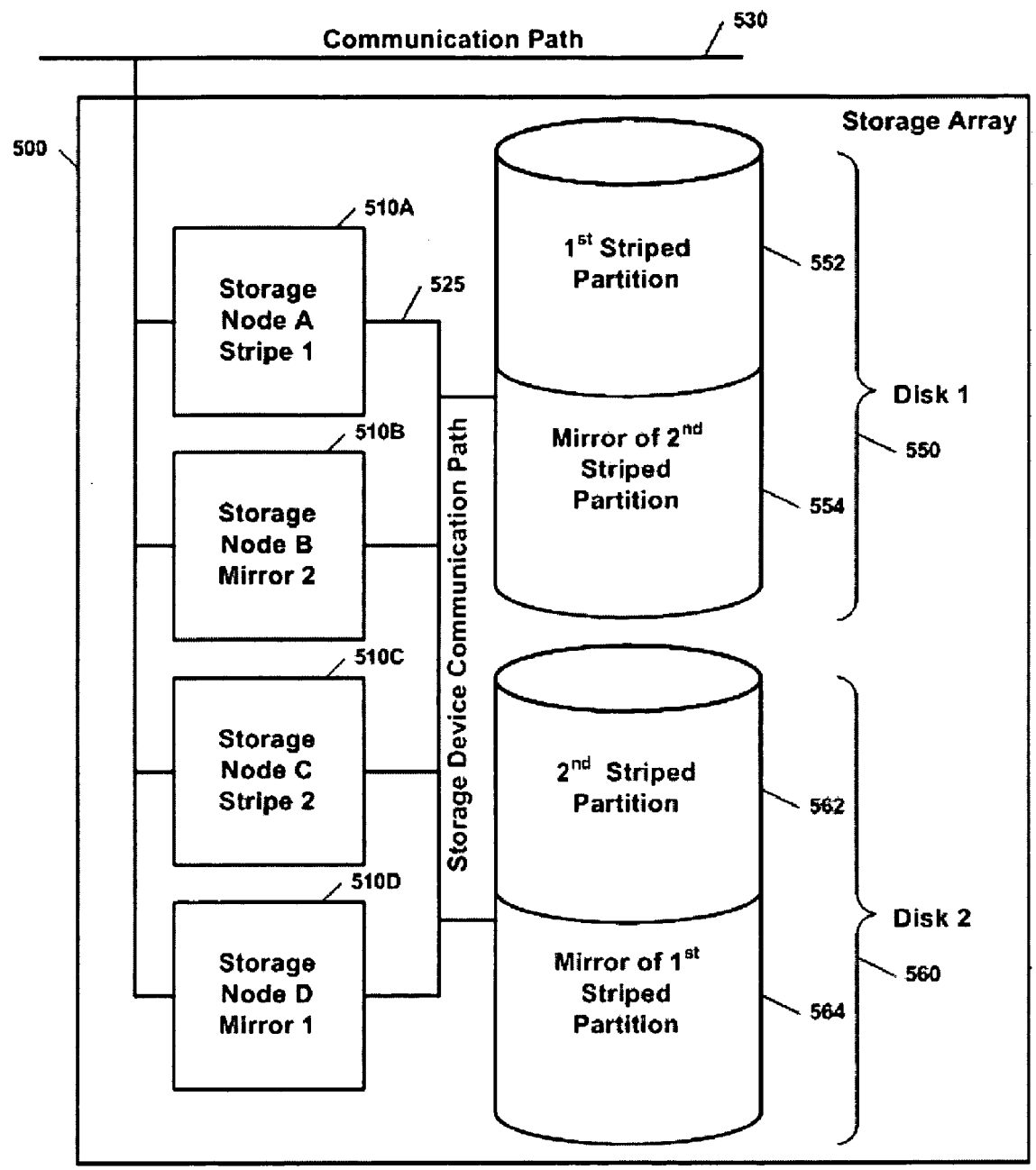
FIG. 5A is a schematic of a possible physical embodiment of a storage array comprising two storage device where each storage device has a mirror partition and a striped partition.

FIG. 5A represents an example two storage device storage array to introduce the nature of a topology independent storage array. Storage array 500 comprises four storage nodes 510A through 510D that communicate external to the array via an interface provide by communication 530. Storage array 550 further comprises a first storage device represented by disk 550 having partitions 552 and 554 and a second storage device represented by disk 560 having partitions 562 and 564. Storage nodes 510A through 510D communicate with disks 550 and 560 through storage device communication path 525. Although the example of storage array 500 presents an example where storage devices are disks, no limitation is implied with respect to the storage devices.

A policy establishes storage array 500 with the depicted configuration comprising a striped group of partitions (partition 552 and partition 562) and a mirrored group of the striped partitions (partition 554 and 564). Partition 564 contains a mirror of the data stored on partition 552 and partition 554 contains a mirror of the data stored on partition 562. Storage nodes 510A through 510D are each responsible for a particular partition on disks 550 and 560. Storage node 510A has responsibility for data blocks that reside on partition 552 and comprises a storage map designed to operate as striped partition. Storage node 510C has responsibility for data blocks that reside on partition 562 and comprises another storage map designed to operate as a second striped partition. In addition storage node 510B comprises a storage map that is similar to that employed by storage node 510C so that it also has responsibility for the same data blocks as storage node 510C, but stores the data blocks on disk 550 within partition 554 rather than on disk 560 thereby mirroring the data on partition 562. Similarly, storage node 510D comprises a storage map that references the same data block IDs as the storage map for storage node 510A and thereby storing the data blocks on disk 560 in within partition 564.

Figure 5B:
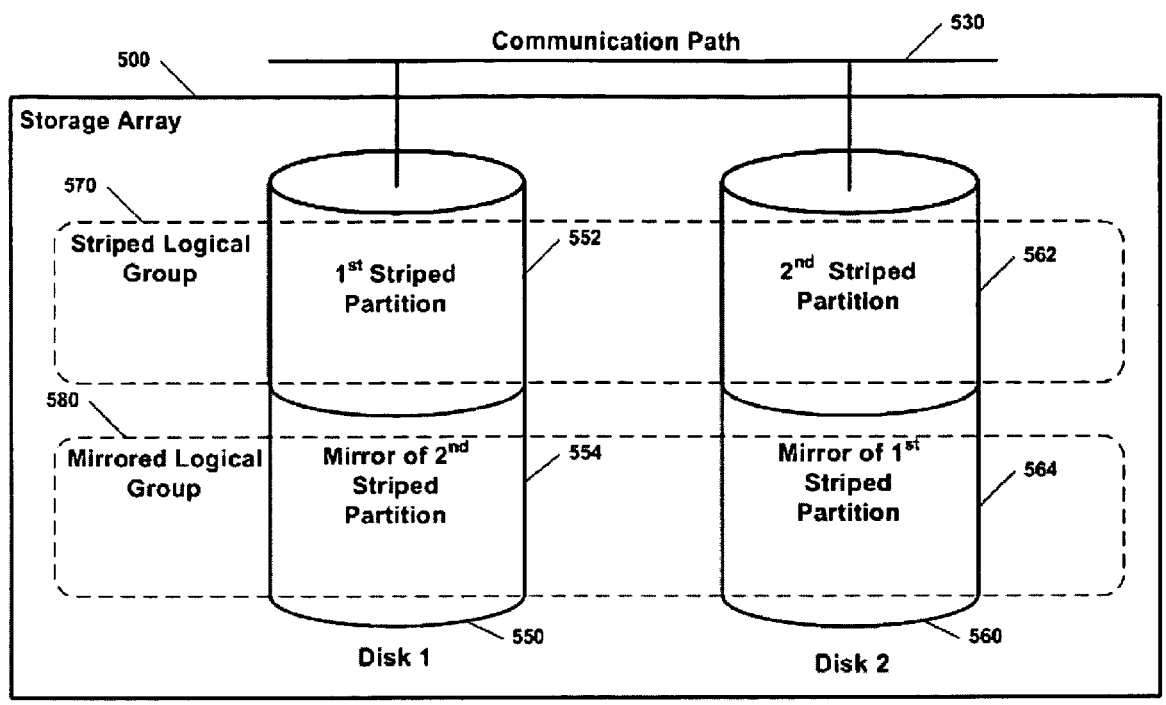
FIG. 5B is a schematic of the two storage device storage array from a logical perspective showing a topology between partitions on the storage devices.

FIG. 5B represents a logical view of the same system in FIG. 5A to clearly show how the partitions combine to form logical groups and to clearly show the relationship of their respective data sets. Striped partitions 552 and 562 combine to form striped logical group 570 and mirrored partitions 554 and 564 combine to form a mirrored logical group 580. The two groups 570 and 580 combine to form a logical volume from the perspective of applications using storage array 500. Mirrored logical volume 580 has its data shifted with respect to striped logical volume 570. The topology of storage array 500 is defined by the relationship between the data sets stored on the partitions. Although the topology of storage array 500 is similar to the Intel Matrix RAID system, there a number of differences. The topology of storage array 500 reconfigures by adding new disks to the array and adding storage nodes to handle data destined for the additional disks where the Intel Matrix cannot. The number of storage nodes, disks, or partitions is arbitrary and the storage maps for storage array 500 operate at the partition level whereas the Intel Matrix RAID's storage map is at the system level. In addition, storage array 500 is scalable where Intel Matrix RAID is not. The topology of storage array 500 results in a RAID-10-like system herein referred to as a "Z-RAID™" that offers performance due to striping data across multiple storage devices and reliability through mirrored data that is shifted or staggered with respect to the primary striped data.

FIG. 5B illustrates how each partition relates to each other from the perspective of their data sets thereby forming a topology. In a preferred embodiment, each storage device comprises multiple partitions that are members of storage array 500. In yet another preferred embodiment, each storage device has a single partition.

EXAMPLES

Topology independent storage arrays like Z-RAID™ systems can offer reliability through parity similar to RAID-5, or through data redundancy; and offer performance through striping data across multiple storage devices. Furthermore, the number of storage devices in a storage array is arbitrary because each storage node is a virtual construct only requiring a processing unit and a memory. Capacity of a Z-RAID™ system scales incrementally with the number of storage devices in the system and the number of storage nodes allocated to the array as determined by the array's policy. If reliability is established through redundant mirrors, the reliability of a Z-RAID™ system increases by increasing the number of staggered mirrors per disk. The following examples show various practical configurations of Z-RAID™ topologies.

A Z-RAID™ topological configuration is named based on the number of mirrors and number of stripes in the system. A Z-RAID™ system with one staggered mirror and one stripe is a Z-RAID 10 where the "1" indicates a RAID-1 mirror and the "0" indicates a RAID-0 stripe. Z-RAID 10 represents a storage array with one staggered mirrored logical group of partitions relative to one striped logical group of partitions resulting in a topology having a Z-10 configuration. As used herein "Z-10 configuration" means a class of storage array topologies where a storage device stores both primary data and copies of data stored on one other storage device. Z-RAID 110 represents a storage array with two staggered mirrored logical groups of partitions relative to one striped logical group resulting in a topology having a Z-110 configuration. As used herein "Z-110 configuration" means a class of storage array topologies where a storage device stores both primary data and copies of data stored on two other storage devices. The number of mirrors and stripes in a Z-RAID™ system is arbitrary. The topology of an array depends on the number of storage nodes assigned to the array as defined by the array's policy.

Example: Z-RAID 10

Figure 6:
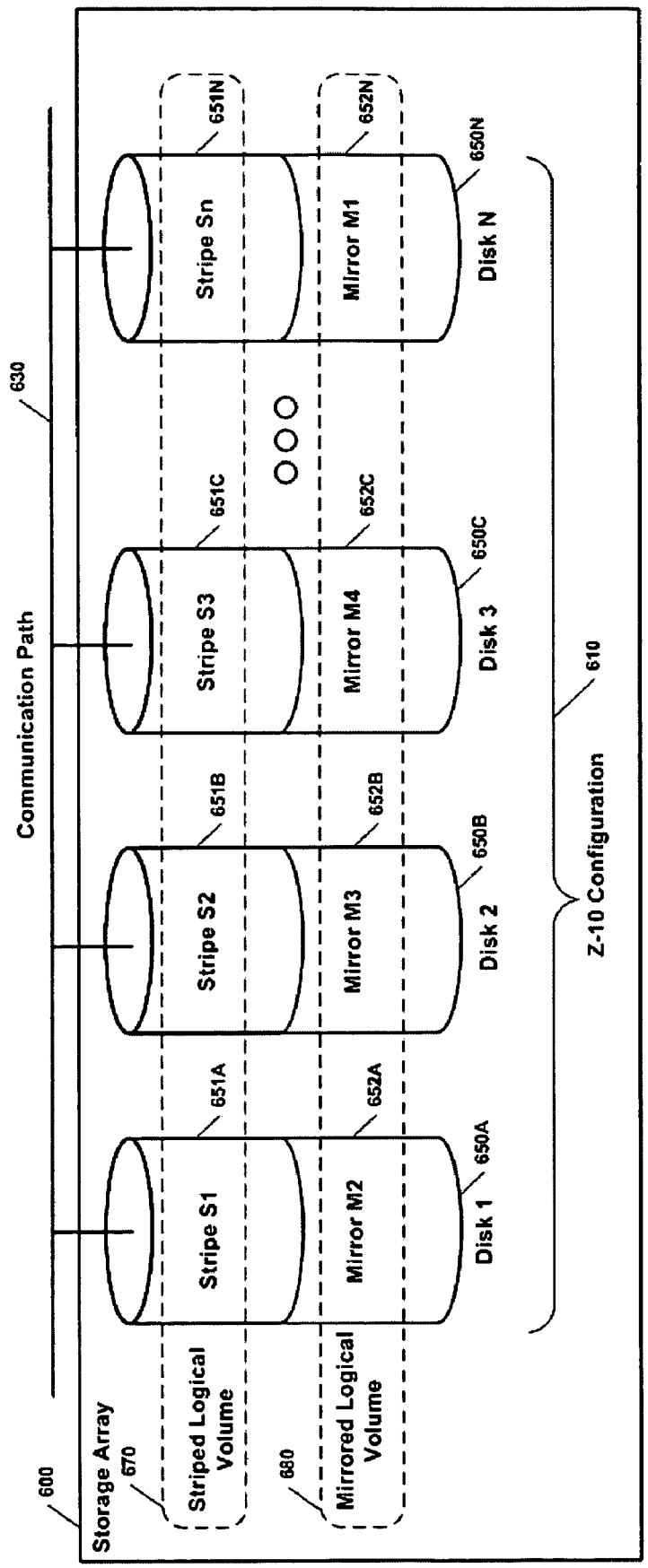
FIG. 6 is a schematic depicting a topology having a Z-10 configuration across multiple storage devices where data is striped across the storage devices and the striped data is mirrored across the storage devices and the mirrored data is staggered relative to the striped data.

FIG. 6 illustrated a logical representation of Z-RAID 10 storage array with a Z-10 configuration. Storage array 600 comprises an arbitrary number of storage devices as represented by disks 650A through 650N. Each disk comprises two partitions, one partition participating in data stripes and one partition mirroring a striped partition. Partitions 651A through 65 1N form striped logical group 670. Partitions 652A through 652N form mirrored logical group 680 that is staggered relative to group 670. The topology of storage array 600 conforms to Z-10 configuration 610. The minimum number of storage devices for a Z-10 configuration is two.

A topology based on a Z-10 configuration 610 offers a number advantages over existing RAID systems from a reliability, performance, availability, or scalability perspective. Storage array 600 offers reliability against data loss due to disk failure because other disks are able to provide backup data. For example, if disk 650B fails, mirror partition 652A provides back up data for partition 651B. When disk 650B rebuilds, the data to rebuild the failed disk is pulled form mirror partition 652A to rebuild striped partition 651B and data is pulled from striped partition 651C to rebuilding mirrored partition 652B. Furthermore, storage array 600 is robust against additional disk failures as long as the disks are not logically adjacent to the first failed disk. "Logical adjacency" means the topological relationship between the data sets on the partitions. Because storage array 600 has a topology based on Z-10 configuration 610, it offers reliability greater than a RAID-5 storage array which is robust against only a single disk failure. Because all disks in the storage array are able to participate in I/O operations in parallel, storage array 600 offers twice the read performance of RAID-10 where only half the disks are able to participate. Each partition within array 600 is governed by a storage node which is a virtual construct. Therefore, additional disks can be added to storage array 600 and new storage nodes can be created by updating the array policy and adding nodes to the topology. The storage maps for a Z-10 configuration provide two physical locations for each data block. In a preferred embodiment, a client uses one part of a split storage map to determine which two storage nodes in a Z-RAID 10 system are responsible for data. The client either sends a data packet individually to each storage node or sends a single packet to both storage nodes collectively. The storage nodes then use their storage maps to further resolve the data block ID to a physical location.

Example: Z-RAID 110

Figure 7:
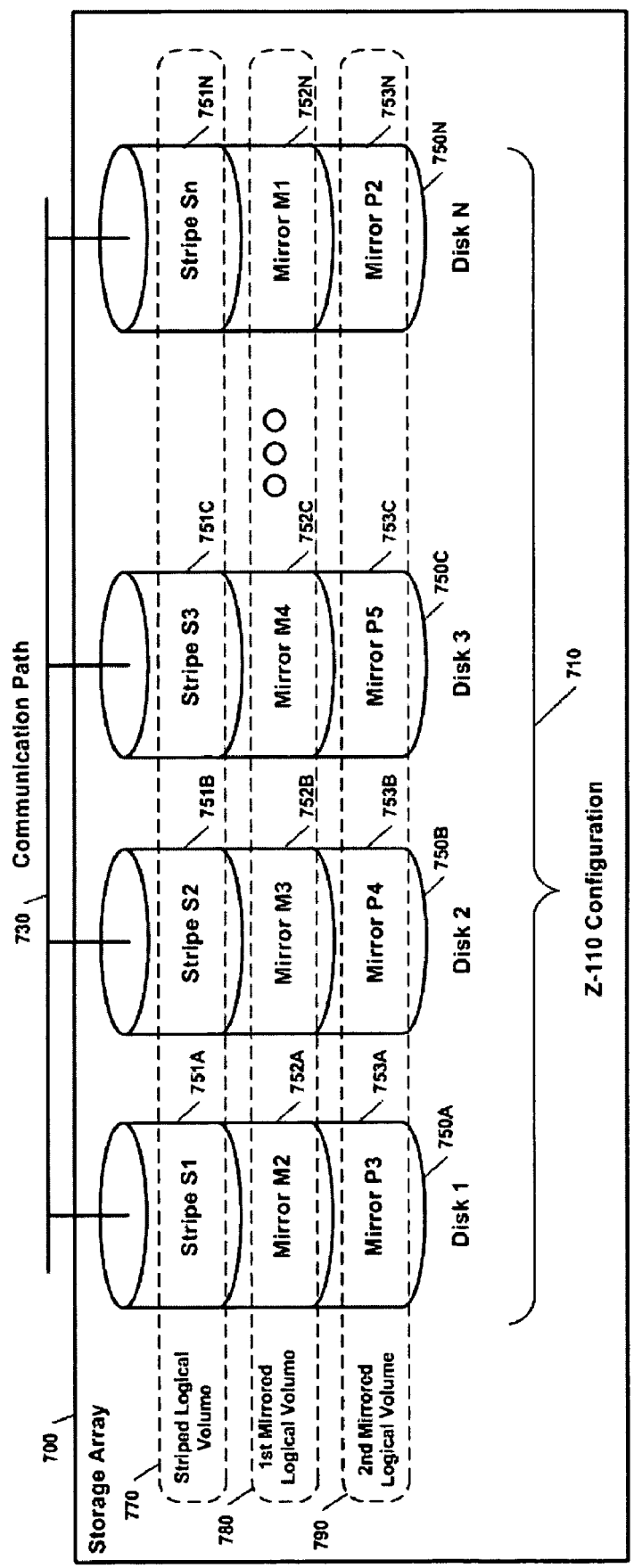
FIG. 7 is a schematic depicting a logical view of a topology having a Z-110 configuration across multiple storage devices.

FIG. 7 illustrates a logical representation of Z-RAID 110 storage array with a Z-110 configuration. Storage array 700 comprises an arbitrary number of storage devices represented by disks 750A through 750N. Z-110 configuration 710 is similar to the Z-10 configuration described previously with the exception that each disk has two mirrored partitions per disks in addition to the striped partitions. Striped partitions 751A through 751N combine to form striped logical group 770. Mirrored partitions 752A through 752N combine to form first mirrored logical group 780 that is staggered relative to striped logical group 770. Mirrored partitions 753A through 753N combine to form second mirrored logical group 790 which is staggered relative to first mirrored logical group 780. The logical groups combine to form storage array 700 which represents as a single logical volume from the perspective of an application. It is contemplated that a Z-110 configuration includes placing a single partition on each storage device. The minimum number of storage devices for a Z-110 configuration is three.

The storage maps for a Z-110 configuration provide three physical locations for each data block. In a preferred embodiment, a client uses one part of a split storage map to determine which three storage nodes in a Z-RAID 110 system are responsible for data. The client sends data packets individually to each storage node or sends a single packet to all storage nodes collectively. The storage nodes then use their own storage maps to further resolve the data block ID to a physical location.

A topology based on Z-110 configuration 710 offers greater reliability than a Z-10 configuration due to the extra mirror. If a disk in storage array 700 fails, any other disk in the array could also fail without the array suffering data loss. In addition, if two logically adjacent disks fail, other disks that are not logically adjacent to the first two failed disk could also fail without the system suffering data loss. Therefore, the storage array 700 with a topology based on Z-110 configuration 710 is more reliable than a RAID-6 system which is robust against only two failed disks. Both the Z-10 configuration and the Z-110 configuration trade available capacity for reliability.

Z-10 configuration and Z-110 are not topologies, but rather classes of topologies. The actual topology of a storage array employing either configuration is determined by the number of storage nodes that are responsible for the partitions in the array. Furthermore, it is contemplated that additional partitions governed by storage nodes outside of a storage array reside on the storage devices and do not participate in the topology of the storage array. Additionally, it is contemplated that both configurations include placing a single partition on each disk rather than multiple partitions per disk because a single partition could be responsible for both primary and mirrored data as defined by a storage map.

Other Examples

A larger number of topologies are possible, each yielding a different set of array parameters that customers find beneficial. Contemplated topological configurations include Z-0+1, or Z-0+11 configurations. Z-0+1 and Z-0+11 configurations are similar to Z-10 and Z-110 configuration, respectively, with the exception that there are single partitions per storage device yielding structures that are similar to a traditional RAID 0+1 where data stripes across a number of disks, then those disks are mirrored on a duplicate set of disks. Z-0+1 and Z-0+11 yield slightly higher reliability at the expense of read performance and scalability. Read performance degrades because only a fraction of the disks in the array participate in I/O processes and scalability degrades because capacity increases by upgrading the array with multiple storage devices at a time rather than with a single storage device; however, the number of storage nodes in the array is reduced providing easier storage node management. Again, topology independent storage array allows customers flexibility in designing a solution that fits the criteria for their applications. All possible topological configurations of storage arrays are contemplated.

Other practical applications of topology independent storage arrays include a rolling Z-RAID™ system, a Z-MAID, or a Z-Archive. A rolling Z-RAID™ system has a topology that changes over time by activating new storage nodes that access new storage devices once existing storage nodes have filled their storage areas. Therefore, each storage node comprises a state that controlled by the storage array as determined by control packets. In this sense, the storage array has an "active window" of storage nodes that roll across an array allowing the array to create snapshots of data as a function of time. A Z-MAID (Massive Array of Inactive Disks) has a topology similar to a rolling Z-RAID™ system where the storage array controls the state of storage devices within the array. As disks fill, the storage array creates new storage nodes that span data to new storage devices. As data spans to new disks, the disk's power is turned on, when inactive the disks are turned off to save power and increase the device's lifetime. Therefore, storage devices within the array comprise state governed by control information within packets passed to the storage array. A Z-Archive also has topology similar to a Z-MAID with the exception that data "snap-shots" are created from mirrored disks. The snap-shot disks are turned off and archived for long term storage. On ordinarily skilled in the art will recognize that they can create traditional RAID systems by utilizing topology independent storage arrays by adjusting data block sizes, by including parity calculations within storage nodes, or by employing other traditional RAID concepts.

In each of the preceding examples, the topology of the array is malleable and can change over time based on the policy established for the array; the control information passed to the array and passed to the storage nodes within the array.

Topology independent storage arrays present a logical volume to an application that appears as a locally connected, raw storage device. Consequently, if an application (or operating system) desires, it further partitions or sub-divides the logical volume just as it can with a locally connected storage device.

Data Interleaving

Figure 8:
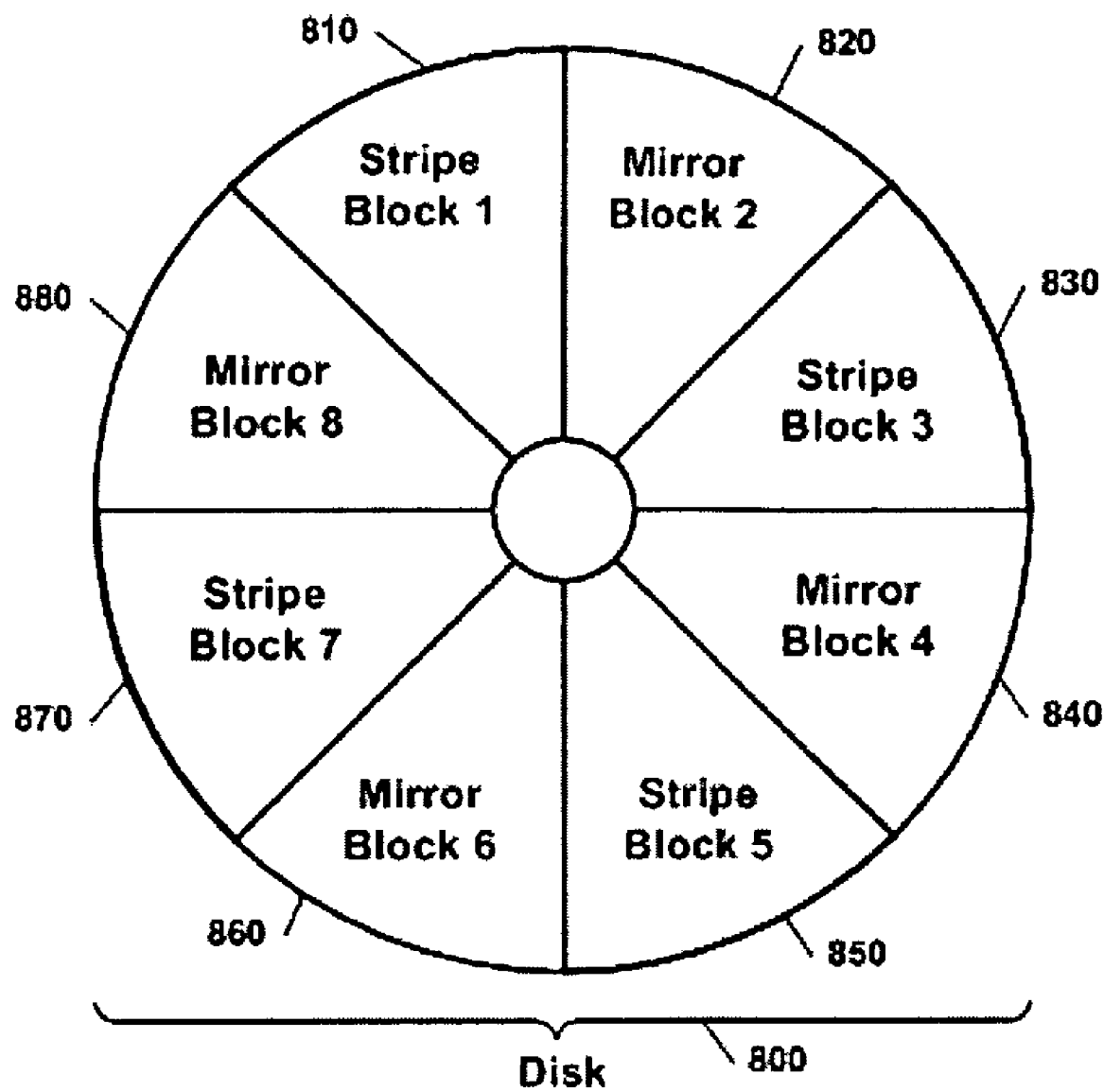
FIG. 8 is a schematic of striped and mirrored data interleaved on a storage medium.

FIG. 8 illustrates the interleaving of striped and mirrored data on a storage device. For the purpose of discussing data interleaving, the storage device is represented by disk 800; however, this should not be interpreted as limiting the scope of the concept. A storage array implemented based on a topology similar to a Z-10, Z-110, or other configuration increases the overall performance of the array by interleaving data. If disk 800 stores both striped data in a striped partition and mirrored data in a mirrored partition, it is advantageous to interleave the data together resulting in data that is placed sequentially on the storage medium. Storage maps associated with the storage nodes representing a striped partition and a mirrored partition instruct storage nodes to place data on a storage medium sequentially. Rather then writing all the striped partition data then writing mirrored data at separate locations on a single disk forcing large head movements, data is written to strip block 810 then to mirror block 820 and so on from 830 to 880 alternating striped and mirrored data. This interleaving of data reduces head movements within a disk thereby increasing performance when streaming large data sets or when rebuilding lost disks. As used herein "interleaving" means placing data on a storage medium in an advantageous arrangement to enhance at least one array parameter associated with the storage array. Contemplated enhanced array parameters include performance.

Storage Array Topology Configuration Method

Figure 9:
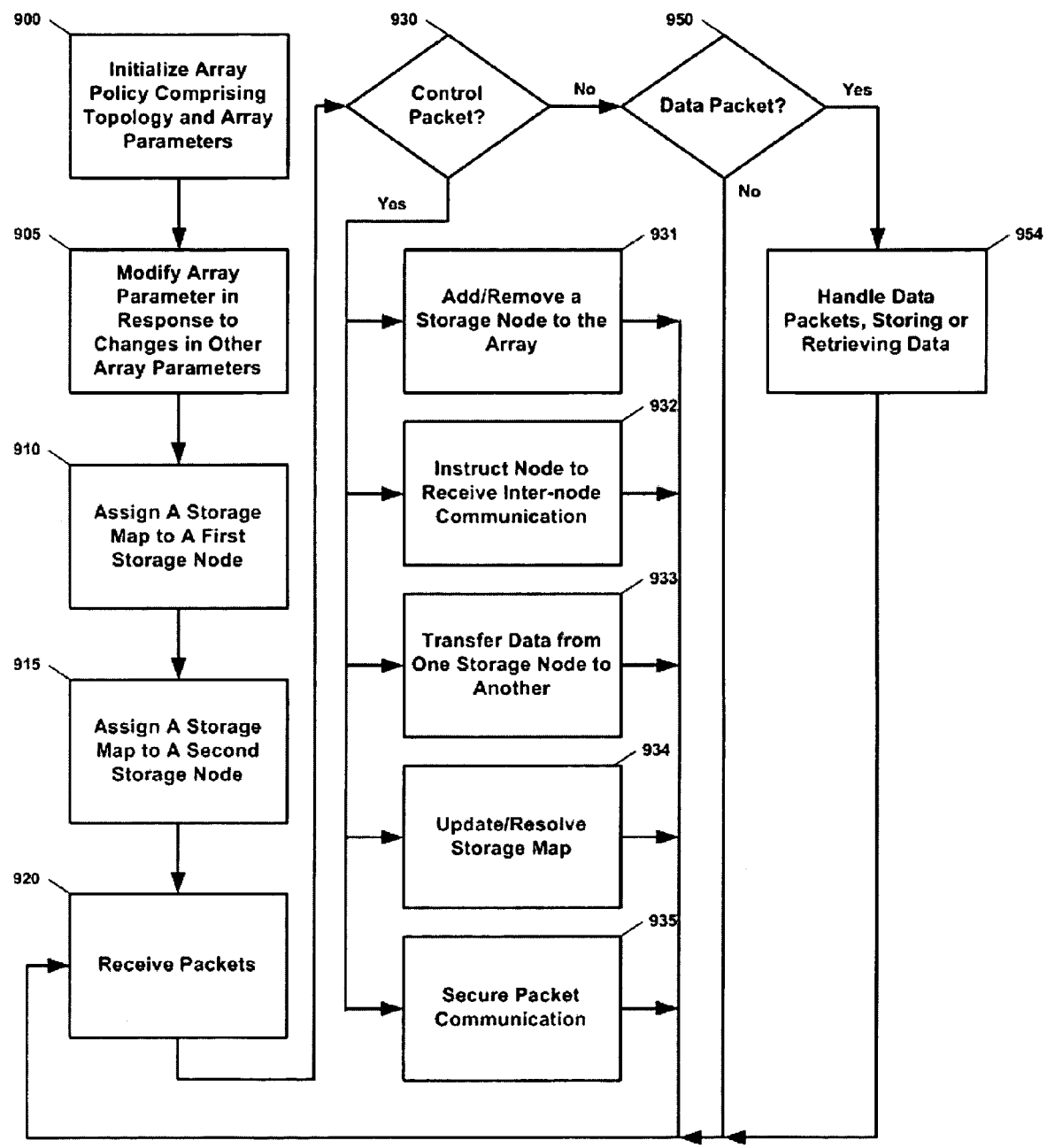
FIG. 9 is a schematic of possible steps used to interact with and configure a topology independent storage array.

FIG. 9 depicts a series of steps illustrating how topology independent storage arrays reconfigure based on control information contained within packets and storage data based on data packets.

Step 900 initializes a policy for a topology independent storage array. The policy comprises the necessary data establishing storage nodes composing the array and the relationships between each node's data set. In addition, the policy comprises array parameters which are used to establish the array topology, storage node arrangement, storage maps, or other necessary configuration information. Contemplated array parameters include metrics based on cost, number of mirrors per storage device, reliability, performance, latency, available capacity, or physical location of data. For example, cost can be used when designing the array to recommend a possible topology based on the total budget for the system. Policies stored in a remote client's memory allows for multiple clients to create multiple storage arrays sharing the same physical equipment. Therefore, each client has a fine tuned view of the storage array based on their required solution criteria. Furthermore, because each storage node is a virtual construct, clients are able to share storage nodes among their individual array views.

Step 905 continues the configuration of a topology independent storage array by allowing array parameters to change in response to changes in other array parameters. For example, if the array has a fixed set of storage devices, available capacity decreases in response to increases in number of mirrors per storage device. Alternatively, the number of recommended storage devices increases in response to increases in desired performance settings. The result of step 900 and step 905 is a storage map used to establish a desired array. The storage map distributes among a number of the array elements if necessary.

Step 910 assigns a storage map to a first storage node within the storage array. Step 915 also assigns a storage map to a second storage node within the array. Based on the storage maps, storage nodes know which data blocks they will be responsible for and where to store the data blocks on storage medium within a storage device. Preferred storage maps including a split storage map where a first sub-map of the storage map resides on a memory within a client using the storage array and a second sub-map of the storage map resides on equipment connected to the storage devices. All other arrangements of split storage maps are also contemplated. Additional contemplated storage maps include maps based on tables or on functions.

At step 920 the array receives packets from external to the array. Packets contain control information used by the array or by the nodes, or the packets contain data block IDs instructing a storage node to manipulate data on a storage medium.

Step 930 determines if the packets are control packets or not. If the packets are control packets, they contain control information that instructs the array to reconfigure the topology of the array. The control information includes a number of instructions that cause the array to reconfigure the topology of the array. Step 931 instructs the array to add or remove a storage node from the array. Step 932 instructs nodes to be receptive to internal packets, packets that are exchanged internal to a storage array, from other nodes in the system. Step 933 instructs nodes to copy data from one node to another. Step 934 instructs the array to update storage maps. Step 935 instructs the array to utilize security to ensure data communicated with the array is secured with a respect to confidentiality, integrity, or authentication. Confidentiality can be established through a cipher once suitable keys have been exchanged. Integrity is maintained via a checksum or other integrity mechanisms. Clients, storage nodes, or other array elements can authenticate through numerous protocols including certificate exchanges, RAIDUS, or Kerberos. Any additional control information resulting in changes to the storage array's topology falls within the scope of the inventive subject matter. After instructions are processed, the array returns to step 920 to continue to receive packets. If packets are not control packets, the array determines if the packets are data packets.

Step 950 determines if the packets are data packets. If the packets are data packets, then at step 954 the array stores data or retrieves data from a storage node based on the data block IDs within the data packets. Data blocks can reside on more than one node. It is contemplated that data stripes across storage nodes or mirrors across storage nodes. Once the data packets are handled, the array returns to step 920 to receive additional packets. If the packets are not data packets, again the array returns to step 920 to receive additional packets.

The decision steps 930 and 950 have no preferential order. Step 950 could determine if packets are data packets before step 930 determines if packets are control packets.

Advantages of Topology Independent Storage Arrays

Topology independent storage arrays, especially those created according to a Z-10 or Z-110 configuration offer a number of advantages over storage arrays implemented based on fixed topologies defined by traditional RAID systems. A mathematical model was built to provide an insight into an architecture-to-architecture comparison between traditional RAID structures and topology independent structures by removing storage device dependencies.

Reliability

Reliability of a storage array means the probability of suffering catastrophic data loss after an initial disk fails. The probability of data loss depends on several factors including disk capacity, disk transfer rate during a disk rebuild, disk mean time between failures, time to rebuild a lost disk, disk bit-error read rate, number of disks in a storage array, or others. Two possible sources of data loss include loosing an additional disk after the first disk fails or suffering a catastrophic read error during rebuilding the initial lost disk. Assuming equivalent systems where storage arrays have equivalent disks and equal number of disks in the array,.a topology independent storage array configured with a topology that conforms to a Z-10 configuration has similar reliability as a RAID-10 system with a fixed topology where a Z-10 configuration has one half the reliability with respect to losing an additional disk and has the same reliability with respect to suffering a catastrophic read error. An array with a Z-10 configuration has much greater reliability than a RAID-5 system for both source of catastrophic data loss. Because a topology independent storage array can have its topology modified, it can reconfigure to fit a Z-110 configuration resulting in a reliability that far exceeds both RAID-10 and RAID-5 reliability. In addition such an array exceeds the reliability for a RAID-6 system. The switch between a Z-10 configuration and a Z-110 configuration trades total available capacity for reliability due to the requirement for additional mirrored data.

Performance

Read performance means the sum of the average sustained throughput of each disk in an array assuming no bottleneck due to an array interface. Topology independent storage arrays conforming to a Z-10 or Z-110 configuration offers greater read performance than an equivalent RAID-10 or RAID-5 system because all disks in the topology independent array are able to participate in I/O processes in parallel due to striping data across all disks. Only half the disks in a RAID-10 are able to participate and in a RAID-5 array only (N−1) disks, where N is the number of disks in the array, are able to participate in I/O processes. Furthermore, topology independent arrays interleave data to further enhance performance and do not suffer from performance limiting parity maintenance.

Topologies comprising multiple mirrors per disk require a disk to write more data to the disk than a single partition per disk. The write performance for a topology independent array can increase by data interleaving or by advantageously arranging the mirrored partitions such that a disk has time to recover between sequential writes.

Some disk drives automatically map logical block addresses to physical locations on the disk to skirt around bad areas. An example includes a SATA disk. Disks that perform this type of automatic mapping can negatively impact performance because the disk's head could require large movements to access sequential data. However, read performance can be maintained within a Z-RAID array implemented with such disks by allowing partitions on multiple disks to respond to requests. When a first partition responds to a request, other subsequent partitions that could respond remove the request from their command queues. Through this operation, the partition that is in the best possible position responds first eliminating the need for waiting for large head movements on the remaining disks. This concept is referred to as "auto annihilate."

Availability

Topology independent storage arrays have greater data availability than traditional RAID systems because the topology independent arrays utilize virtual storage nodes. Virtual storage nodes offer the system the ability to migrate data from one physical location to another in manner that is transparent to applications using the array. Should one physical location come under risk or disappear, the array duplicates data according to the policy and the array reconfigures its topology. Furthermore, physical location can be used in determining a topology of an array to ensure data is protected from environmental risks including chassis failures, power failures, or other data threatening events. The minimum requirement for a storage node to migrate data is the node's storage map updates the physical location of data blocks and existing data is copied to the new physical location.

Capacity

Depending on the configuration of the topology independent storage array, the available capacity for storage varies from the sum of the capacity of the disks down to a fraction of the capacity depending on the configuration of the topology. For a topology based on a Z-10 configuration, the available capacity of the array is half the total capacity and for a topology based on a Z-110 configuration the available capacity is one third of the total capacity. The capacity of the array increases by adding additional disks to the array and creating new storage nodes to handle the extra available capacity.

Scalability

Topology independent storage arrays scale at the atomic level, the disk level. This is true for several reasons. First, the storage array adheres to a policy based in memory and is therefore a virtual structure that changes as additional resources are added to the array. Furthermore, a storage map can exist in a remote client's memory allowing the client to add resources to its array without affecting other client's arrays. Second, the storage nodes that manage storage medium are also virtual allowing additional disks integrate into the array by creating new storage nodes that handle additional data block IDs, or alternatively changing storage maps of existing nodes to take on larger groups of data block IDs. An application will only see the available capacity of the array increase.

Topology independent storage arrays are also able to scale at a macro level. Enclosure holding multiple disks, remote disks, or client memories can integrate together forming larger arrays. As a topology independent storage array expands with new hardware, old hardware remains useful because the resource provided by hardware is virtualized. Furthermore, a topology independent storage array is future proofed because its topology can alter after being deployed to ensure it fits the criteria of a customer.

Cost

Topology independent storage arrays provide affordable solutions to customers because the storage arrays are built using less expensive equipment while maintaining high reliability and performance. For example, a storage array with a Z-10 configuration built from less expensive SATA disks provide greater read performance and reliability than a RAID-5 system based on a SCSI disks. When storage arrays are implemented using existing networks, customers do not have to purchase additional storage fabric networks to realize their solution which is especially beneficial to consumer or SMB environments where costs are a constraint relative to performance and reliability. In addition, topology independent storage arrays distribute functionality among array elements reducing the need for centralized hardware to manage the entire array thereby further reducing the costs of the array.

Embodiments

Topology independent storage arrays can be implemented in a number of different ways. The array can be implemented based on self contained enclosures that utilize hardware to handle storage nodes and access to storage devices. Alternatively the array can be implemented based on networking infrastructure to alleviate dependency on hardware.

Enclosure Approach

A preferred embodiment of a topology independent storage utilizes combination of hardware, software or firmware to form an array communication path on an internal bus. The enclosure stores the array's policy within its memory and handles all storage nodes internally. The enclosure represents the entire array and manages storage nodes through internal communications. The advantage of an enclosure approach is a centralized system allowing multiple clients to have access to the exact same array without the clients requiring a storage map; however, it is not completely extensible because storage nodes within the enclosure are not able to combine with storage nodes from other systems easily. A centralized approach also creates an artificial bottleneck because all clients must pass through a choke point for servicing. A decentralized approach allows all nodes to participate equally without artificially creating a bottleneck. Additional hardware costs are incurred to support hardware acceleration.

Network Centric Approach

A more preferred embodiment comprises using storage nodes that are virtual devices on a network where the storage nodes have IP enable partitions as outlined in Zetera™ patent "Data Storage Devices Having IP Capable Partitions" U.S. patent application Ser. No. 10/473509. Each disk partition has an associated IP address used by clients and other nodes to address the storage node. Multiple storage nodes combine via multicast groups to form larger logical storage structures. Clients keep track of which partitions form an array through the array policy or through storage maps. Clients communicate directly with storage nodes through IP unicasts or with the group through IP multicasts. Given such a structure, each node is independent of all other nodes because it uses its storage map to determine if it should handle data or silently ignore data packets and therefore does not require additional information from other nodes. Independent nodes can be added to the system extending the performance, capacity, or reliability automatically. This approach has the advantage of allowing multiple arrays to combine together to form larger arrays, multiple clients share the same storage devices while having different views of the array, multiple clients share the same array by sharing the same view, or the array tailors to fit the exact needs of a client by adjusting array parameters.

An example storage array, without implied limitation, includes a device driver that resides below a file system that provides access to a storage array and disk adapters that provide network connectivity to disk drives. The device driver allows a client to perceive at least part of the storage array as a single raw locally attached volume. In addition, the device driver assigns data block IDs to data blocks exchanged with the operating systems, file system, or other applications. The device driver also communicates directly with storage nodes within disk adapters over a network or with a set of storage nodes composing a logical volume. The disk adapters comprise sufficient software or firmware to establish storage nodes that communicate with each other or with clients. Disk adapters could realize storage nodes by employing a monolithic piece code that uses table look ups for storage node names, address, or storage maps. Additionally, storage nodes could be realized at tasks or threads within an operating system with a TCP/IP stack.

By using networking infrastructure to handle packet routing from clients to node, the burden on line-rate processing is alleviated from hardware increasing the over all performance of the system. In addition, administrators who develop and deploy storage arrays are no longer required to understand equipment beyond networking equipment which reduces the time to deploy a system and reduces costs because there is no learning curve to overcome.

Software

In still another aspect, it is contemplated that one could write software that would configure, simulate, or manage topology independent storage arrays and their associated infrastructure. From that perspective the inventive subject matter includes methods of writing such software, recording the software on a machine readable form, licensing, selling, distributing, installing, or operating such software on suitable hardware. Moreover, the software per se is deemed to fall within the scope of the inventive subject matter.

Thus, specific compositions and methods of topology independent storage arrays have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps may be present, or utilized, or combined with other elements, components, or steps that are not expressly referenced.

What is claimed is:

1. A method comprising:
providing, to a storage node, a first storage sub-map to map a plurality of data block identifiers to a corresponding plurality of physical locations on a storage device, the first storage sub-map being specific to the storage node;
providing, to a client device, a second storage sub-map to map a data block identifier, of the plurality of data block identifiers, to the storage node and the second storage sub-map to further map another data block identifier to another storage node; and
providing, to the another storage node, a third storage sub-map to map the another data block identifier to a physical location on the storage device or on another storage device, the first storage sub-map, the second storage sub-map, and the third storage sub-map configured to implement a topology of a storage array according to an array policy, the storage array having a plurality of storage nodes, including the storage node and the another storage node, and a plurality of storage devices, including the storage device and the another storage device.

2. The method of claim 1, wherein the physical location is on the another storage device.

3. The method of claim 1, wherein the physical location is on the storage device.

4. The method of claim 1, wherein the corresponding plurality of physical locations on the storage device are in a first partition and the method further comprises:
providing the third storage node sub-map to the another storage node to map another plurality of data block identifiers to another corresponding plurality of physical locations in a second partition of the storage device.

5. The method of claim 1, wherein said providing the second storage sub-map comprises:
providing, via a network communication path, the second storage sub-map to the client device.

6. The method of claim 1, further comprising directing the storage node to be receptive to receiving an internal packet from the another storage node of the storage array.

7. The method of claim 1, further comprising directing the storage node to be receptive to a packet from external to the storage array.

8. The method of claim 1, further comprising modifying the array policy by updating the first storage sub-map and/or the second storage sub-map.

9. The method of claim 1, wherein the second storage sub-map is configured to allow the client device to interact with the storage node to access a corresponding physical location of the plurality of physical locations by transmitting a packet including the data block identifier to the storage node.

10. A method comprising:
providing, to a storage node, a first storage sub-map to map a plurality of data block identifiers to a corresponding plurality of physical locations on a storage device, the first storage sub-map being specific to the storage node; and
providing, to a client device, a second storage sub-map to map a data block identifier, of the plurality of data block identifiers, to the storage node, the first storage sub-map and the second storage sub-map configured to implement a topology of a storage array according to an array policy, the storage array having a plurality of storage nodes, including the storage node and another storage node, and a plurality of storage devices, including the storage device, wherein the second storage sub-map is to further map the data block identifier to the another storage node to provide the client device direct access to the another storage node from among the plurality of storage nodes.

11. A storage array comprising:
a first storage node to communicate with a storage device, the first storage node being responsible for access to a first partition of the storage device by having a first storage map to map a plurality of data block identifiers to the first partition, the first storage node being directly addressable by communications received from a network external to the storage array and the first partition being associated with a striped logical group; and
a second storage node to communicate with the storage device, the second storage node being responsible for access to a second partition of the storage device by having a second storage map to map another plurality of data block identifiers to the second partition, the second storage node being directly addressable by communications received from the network and the second partition to mirror a third partition associated with the striped logical group.

12. The storage array of claim 11, further comprising:
a plurality of storage devices including the storage device; and
a plurality of storage nodes, including the first and second storage nodes, having a corresponding plurality of storage maps to define an array policy that establishes a topology of the storage array.

13. The storage array of claim 12, wherein the array policy comprises a first array parameter and a second array parameter where the first array parameter is modified in response to changes to the second array parameter.

14. The storage array of claim 13, wherein the first array parameter and the second array parameter are independently selected from a list of parameters, including a cost parameter, a number of mirrors per storage device parameter, a reliability parameter, a performance parameter, a latency parameter, or an available capacity parameter.

15. The storage array of claim 12, wherein the corresponding plurality of storage maps are a corresponding plurality of first storage sub-maps to map data block identifiers to physical locations of the plurality of storage devices, and the array policy is further defined by one or more second storage sub-maps provided to a corresponding one or more client devices to map data block identifiers to the plurality of storage nodes.

16. The storage array of claim 12, wherein at least some of the plurality of storage nodes are configured to receive control information to update a respective storage map to change the topology of the storage array.

17. The storage array of claim 12, wherein the topology comprises the striped logical group striped across the plurality of storage devices and a mirrored logical group, to mirror the striped logical group, striped across the plurality of storage devices, the mirrored logical group shifted with respect to the striped logical group by at least one storage device.

18. The storage array of claim 17, wherein the topology further comprises another mirrored logical group, to mirror the mirrored logical group, striped across the plurality of storage devices and shifted, with respect to the mirrored logical group, by at least one storage device.

19. The storage array of claim 11, further comprising:
a network communication interface to communicatively couple the first storage node and the second storage node to the network.

20. The storage array of claim 11, further comprising:
a controller configured to provide a client a third storage map to map a first data block identifier to the first storage node and a second data block identifier to the second storage node.

21. The storage array of claim 11, wherein both the plurality of data block identifiers and the another plurality of data block identifiers includes a first data block identifier.

22. The storage array of claim 11, wherein the first partition is interleaved with the second partition.

23. A system comprising:
means for providing, to a storage node, a first storage sub-map to map a plurality of data block identifiers to a corresponding plurality of physical locations on a storage device, the first storage sub-map being specific to the storage node;
means for providing, to a client device, a second storage sub-map to map a data block identifier, of the plurality of data block identifiers, to the storage node and the second storage sub-map to further map another data block identifier to another storage node; and
means for providing, to the another storage node, a third storage sub-map to map the another data block identifier to a physical location on the storage device or on another storage device, the first storage sub-map, the second storage sub-map, and the third storage sub-map configured to implement a topology of a storage array according to an array policy, the storage array having a plurality of storage nodes, including the storage node and the another storage node, and a plurality of storage devices, including the storage device and the another storage device.

24. The system of claim 23, wherein the physical location is on the another storage device.

25. The system of claim 23, wherein the physical location is on the storage device.

26. The system of claim 23, wherein the corresponding plurality of physical locations on the storage device are in a first partition and the system further comprises:
means for providing the third storage sub-map to the another storage node to map another plurality of data block identifiers to another corresponding plurality of physical locations in a second partition of the storage device.

27. The system of claim 23, further comprising
means for directing the storage nodes to be receptive to a packet from external to the storage array.

28. The system of claim 23, further comprising
means for modifying the array policy by updating the first storage sub-map and/or the second storage sub-map.

29. A system comprising:
means for providing, to a storage node, a first storage sub-map to map a plurality of data block identifiers to a corresponding plurality of physical locations on a storage device, the first storage sub-map being specific to the storage node; and
means for providing, to a client device, a second storage sub-map to map a data block identifier, of the plurality of data block identifiers, to the storage node, the first storage sub-map and the second storage sub-map configured to implement a topology of a storage array according to an array policy, the storage array having a plurality of storage nodes, including the storage node, and a plurality of storage devices, including the storage device, wherein the second storage sub-map is to further map the data block identifier to another storage node to provide the client device direct access to the another storage node from among the plurality of storage nodes.

* * * * *